United States Patent
Marks et al.

(10) Patent No.: US 7,651,777 B1
(45) Date of Patent: Jan. 26, 2010

(54) LAYER BY LAYER SELF-ASSEMBLY OF LARGE RESPONSE MOLECULAR ELECTRO-OPTIC MATERIALS BY A DESILYLATION STRATEGY

(75) Inventors: Tobin J. Marks, Evanston, IL (US); Milko E. van der Boom, Rishon le Zion (IL); Seong-Sik Chang, Chicago, IL (US); Seng-Tiong Ho, Wheeling, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 10/254,335

(22) Filed: Sep. 25, 2002

Related U.S. Application Data

(63) Continuation-in-part of application No. 09/815,951, filed on Mar. 22, 2001, now Pat. No. 6,855,274.

(60) Provisional application No. 60/191,360, filed on Mar. 22, 2000.

(51) Int. Cl.
*B32B 15/04* (2006.01)

(52) U.S. Cl. .................. 428/450; 359/328; 359/329; 252/582

(58) Field of Classification Search .......... 252/582, 252/587, 589; 359/328, 329; 428/450
See application file for complete search history.

(56) References Cited

U.S. PATENT DOCUMENTS

| | | | |
|---|---|---|---|
| 4,720,432 A | 1/1988 | VanSlyke et al. | |
| 5,034,280 A * | 7/1991 | Gotoh et al. | 428/513 |
| 5,156,918 A | 10/1992 | Marks et al. | |
| 5,217,792 A * | 6/1993 | Chidsey et al. | 428/207 |
| 5,276,381 A | 1/1994 | Wakimoto et al. | |
| 5,401,569 A * | 3/1995 | Kineri et al. | 428/323 |
| 5,472,777 A * | 12/1995 | Kineri et al. | 428/323 |
| 5,834,100 A | 11/1998 | Marks et al. | |
| 5,858,541 A * | 1/1999 | Hiraoka et al. | 428/429 |
| 5,963,360 A * | 10/1999 | Sato et al. | 359/326 |
| 6,033,773 A | 3/2000 | Yang et al. | |
| 6,033,774 A | 3/2000 | Yitzchaik et al. | |
| 6,165,383 A | 12/2000 | Chou | |
| 6,348,992 B1 | 2/2002 | Zhang et al. | |
| 6,361,717 B1 | 3/2002 | Dalton | |
| 6,399,221 B1 | 6/2002 | Marks et al. | |
| 6,549,685 B2 | 4/2003 | Marks et al. | |
| 6,572,784 B1 * | 6/2003 | Coombs et al. | 252/301.16 |
| 6,737,145 B1 * | 5/2004 | Watanabe et al. | 428/64.4 |
| 2003/0162053 A1 | 8/2003 | Marks et al. | |
| 2004/0004982 A1 * | 1/2004 | Eisler et al. | 372/43 |
| 2004/0092195 A1 | 5/2004 | Marks et al. | |

OTHER PUBLICATIONS

Van Der Boom, ME; Evmenenko, G; Dutta, P; and Marks, TJ; Nanoscale Refractive Index Tuning of Siloxane-Based Self-Assembled Electro-Optic Superlattices; Adv. Funct. Mater., Oct. 2001, 1-5, vol.11, No. 5.

(Continued)

*Primary Examiner*—Kuo-Liang Peng
(74) *Attorney, Agent, or Firm*—Reinhart Boerner Van Deuren s.c.

(57) ABSTRACT

The preparation of robust, thin film materials with large second-order optical nonlinearities through the covalent self-assembly of chromophoric compositions and innovative use of silyl chemistry.

5 Claims, 19 Drawing Sheets

OTHER PUBLICATIONS

Nguyen TQ; and Kausch, HH; Mechano-Chemical Degradation of Polymer Solution in Capillary Flow: Laminar and Turbulent Regime; Chimia, 1986, 129-135, vol. 40, No. 4.

Merril, EW; and Leopairat, P; Scission of Non-Interpenetrating Macromolecules in Transient Extensional Flows; Polymer Engineering and Science, Mid-May 1980, 505-511, vol. 20, No. 7.

* cited by examiner

| |  |  |  |  |
|---|---|---|---|---|
| β (0.65 eV)calcd. ($10^{-30}$ cm$^5$esu$^{-1}$) | 178 | 360 | 1288 | 1617 |
| $\lambda_{max}$, calcd. (nm) | 572 | 498 | 658 | 666 |
| Film $r_{33}$, $\omega_o$=1064 nm (pm/V) | 56 | 125 | 410 (est.) | 525 (est.) |

FIGURE 18A
FIGURE 18B
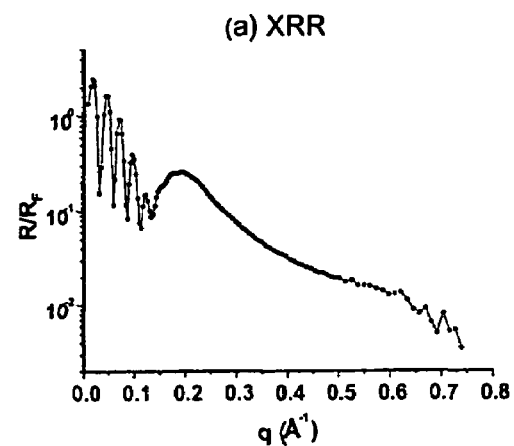
(a) XRR
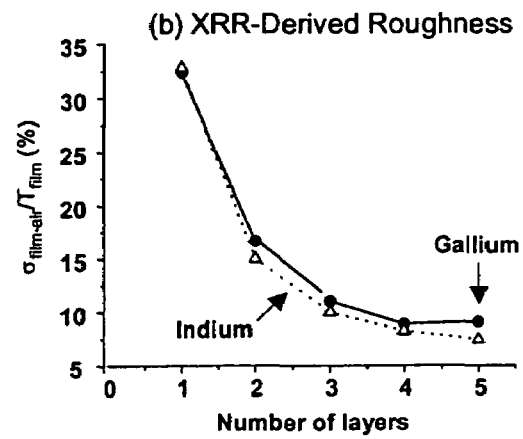
(b) XRR-Derived Roughness
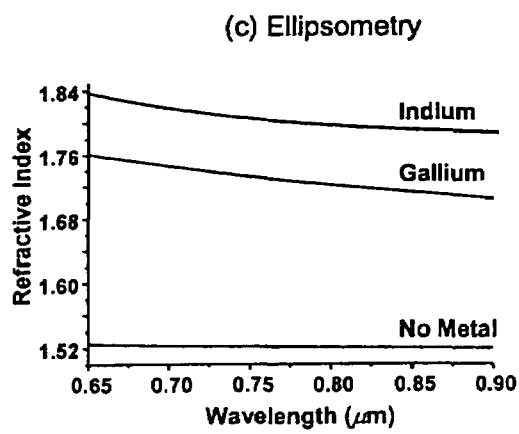
(c) Ellipsometry
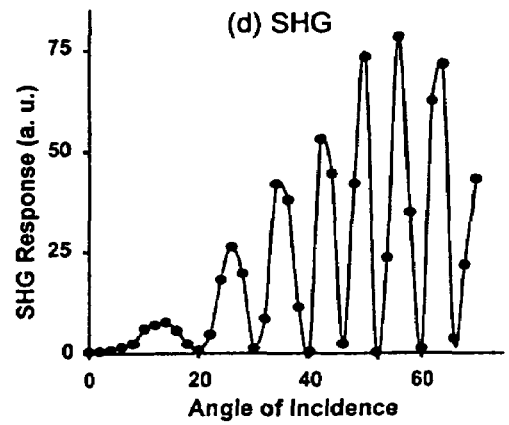
(d) SHG
FIGURE 18C
FIGURE 18D

LAYER BY LAYER SELF-ASSEMBLY OF LARGE RESPONSE MOLECULAR ELECTRO-OPTIC MATERIALS BY A DESILYLATION STRATEGY

This application is a continuation-in-part of and claims priority benefit from application Ser. No. 09/815,951 filed Mar. 22, 2001 now U.S. Pat. No. 6,855,274 and prior U.S. provisional application No. 60/191,360, filed Mar. 22, 2000, each of which is incorporated herein by reference in its entirety.

The United States government has rights in this invention pursuant to Grant No. DMR 9632472 from the National Science Foundation and Grant No. ONR N00014-95-1-1219 from the Office of Naval Research, both to Northwestern University.

BACKGROUND OF THE INVENTION

Organic molecule-based optical technology components such as electro-optic modulators promise greatly increased rates of information transmission by enhancing network speed, capacity, and bandwidth for data networking and telecommunications. There is a vast need for increased data handling density in photonic devices, and future high-speed fiber-optic networks will be required to carry orders of magnitude more data than possible with conventional electronic systems and to easily handle phone calls, e-mail, webpages, video, and high-definition television (HDTV) signals. Therefore, the development of new electro-optic/second-order non-linear optical (NLO) materials with excellent optical, thermal, and chemical properties is a topic of great current scientific interest. Of the synthetic approaches investigated, Langmuir-Blodgett (LB) film transfer, polymer poling, and self-assembly (SA) have been used to obtain soft thin films with a variety of electro-optic response properties.

Intrinsically acentric SA organic materials can exhibit far higher electro-optic coefficients and lower dielectric constants than established inorganic materials (e.g., lithium niobate and potassium dihydrogen phosphate), and do not require electric field poling. (For reviews see the *Chem. Rev.* special issue on *Optical Nonlinearities in Chemistry*, ed: D. M. Burland, 1994, 94, 1-278.) Chemisorptive siloxane SA was originally developed by Sagiv (R. Moaz, J. Sagiv, *Langmuir* 1987, 3, 1034-1044) and is known to yield robust, densely packed organic films on hydroxylated surfaces. Self-assembled mono- and multilayered structures are accessible with relatively simple hydro- or fluorocarbon chains (A. Ulman, *An Introduction to Ultrathin Organic Films: from Langmuir-Blodgett to Self-Assembly*, Academic Press, Inc. San Diego, 1991), whereas fabrication of complex superlattices is relatively rare. For instance, Katz, et al. reported the formation of acentric multilayers by alternately depositing layers of phosphonate-substituted azo chromophores and zirconyl salts. (H. E. Katz, W. L., Wilson, G. Scheller, *J. Am. Chem. Soc.*, 1994, 116, 6636-6640.)

Previous studies showed that robust, acentric mono- and multilayered structures composed of stilbazolium and related chromophores (See, FIGS. 1A-C) and exhibiting very large NLO response properties ($\chi^{(2)}$=150-200 pm/V) can be obtained by a three-step procedure, the second of which involves a cumbersome spin-coating of chromophore solutions, followed by vacuum oven treatment. The synthetic tools available for the formation of surface-bound functional organic multilayered structures are rather limited in comparison to the tremendous variety of reactions known in solution phase organic chemistry.

Organic monolayers containing nonpolar end-groups are chemically inert towards binding of chloro- or alkoxy silanes from the solution phase. However, regeneration of a new reactive hydroxylated or carboxylated surface is an essential requirement for the iterative growth of siloxane-based multilayers. In order to form highly ordered multilayered structures, a constant and/or a large density of reactive sites must be present at the surface of each added layer. To this end, it was recently demonstrated that 9-fluorenylmethoxycarbonyl (Fmoc) and di-p-methoxytrityl (DMT) groups can be used for the reversible protection of amine and hydroxyl-terminated alkanethiol monolayers on gold substrates. (Frutos, J. M. Brockman, R. M. Corn, *Langmuir* 2000, 16, 2192-2197.) Hydroboration or oxidation of terminal double bonds (L. Netzer, J. Sagiv, *J. Am. Chem. Soc.* 1983, 105, 674-676; R. Moaz, S. Matlis, E. DiMasi, B. M. Ocko, J. Sagiv, *Nature* 1996, 384, 150), hydrolysis of phosphonate esters (G. A. Neff, C. J. Page, E. Meintjes, T. Tsuda, W. C. Pilgrim, N. Roberts, W. W. Warren, Jr., *Langmuir* 1996, 12, 238-242), reduction of methyl esters (S. R. Wasserman, Y. T. Tao, G. M. Whitesides, *Langmuir* 1989, 5, 1074-1087; M. Pomerantz, A. Segmuller, L. Netzer, L. Sagiv, *J. Thin Solid Films* 1985, 132, 153-162), and photolysis of organic thin films (R. J. Collins, I. T. Bae, D. A. Scherson, C. N. Sukenik, *Langmuir* 1996, 12, 5509-5111) have also been used to create hydroxyl-terminated surfaces.

SUMMARY OF THE INVENTION

In light of the foregoing, it is an object of the present invention to provide chromophores, non-linear optic materials and/or integrated devices and methods for the production and/or assembly of such chromophores, materials and devices, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It is an object of the present invention to provide a new, efficient self-assembly technique to prepare electro-optic materials that can be used for the growth of robust, intrinsically polar arrays of covalently bound high-hyper-polarizability ($\beta$) chromophores directly on silicon or other suitable substrates, so as to allow formation of a variety of electro-optic and related integrated devices. Accordingly, it can also be an object of the present invention to integrate the chromophores, composition, films and/or materials of this invention into device type structures such as planar waveguides (for frequency doubling) and electro-optical modulators.

It can also be an object of the present invention to integrate a wet chemical approach into a straightforward methodology for the assembly of large response electro-optic superlattices.

It can also be an object of the present invention to provide second-order chromophoric thin films, as can be constructed with sub-nanometer level control of layer dimension, with microstructural acentricity preserved, layer by layer, during assembly.

Other objects, features, benefits and advantages of the present invention will be apparent from this summary and its descriptions of various preferred embodiments, and will be readily apparent to those skilled in the art having knowledge of various non-linear optic materials, devices and assembly/production techniques. Such objects, features, benefits and advantages will be apparent from the above as taken into conjunction with the accompanying examples, data, figures and all reasonable inferences to be drawn therefrom, alone or with consideration of the references incorporated herein.

In part, the present invention is a method of using silyl chemistry to control the reactivity of a self-assembled molecular electro-optic material. The method includes (i) providing an electro-optic material having a silyl-derivatized chromophore; (ii) desilylating the chromophore to generate terminal hydroxy functionalities, and (iii) reacting the hydroxy functionalities with a reagent having at least one silicon moiety. In preferred embodiments, the chromophore is a high-β chromophore and/or is derivatized with a trialkylsilyl protecting group. Such protecting groups useful with the present invention are limited only by the availability of the corresponding silane precursor compound and/or the effectiveness of the resulting protecting group in the self-assembly procedures described herein. Effectiveness is, in part, based on the deprotection of the hydroxy functionality and removal of the protecting group. Various deprotecting agents are available and would be well known to those skilled in the art of silyl chemistry and its integration into the present invention. Preferably, fluoride reagents can be used with good effect, in particular quaternary ammonium fluoride reagents. Various protecting groups and reagents along with corresponding deprotection schemes would be well-known to those skilled in the art and aware of this invention. See, T. W. Greene and P. G. M. Wuts, "*Protective Groups in Organic Synthesis*", 1999, 3rd ed., John Wiley & Sons, Inc., New York.

In part, the present invention is also a method of using silyl chemistry to generate a hydrophilic surface for molecular self-assembly of an electro-optic material. Such a method includes (i) providing an electro-optic material comprising a high-β chromophore film with terminal trialkylsiloxy moieties, (ii) desilylating the film to generate terminal hydroxy functional groups, and (iii) reacting the terminal hydroxy functional groups with a siloxane capping agent. With reference to the discussion, above, the trialkylsiloxy moieties correspond to the aforementioned silyl protecting groups and are derived from the appropriate silane reagents upon reaction with the chromophore material. Desilylation can be achieved as discussed elsewhere, with the resultant terminal hydroxy groups reactive with a reagent having at least one silicon moiety. In preferred embodiments, such a reagent is a siloxane. Octachlorotrisiloxane is an especially preferred siloxane capping agent, but other molecular components can be used with similar effect. Such components include, without limitation, the bifunctional silicon compounds described in U.S. Pat. No. 5,156,918, at column 7 and elsewhere therein, incorporated by reference herein in its entirety. Other useful components, in accordance with this invention include those compounds which cross-link upon curing. Reaction between the terminal hydroxy groups and the capping agent provides a siloxane bond sequence between the chromophore film/layer and capping layer.

Deprotection of a chromophore followed by coupling with a capping agent provides a siloxane bonded bilayer. Sequential repetition of this synthetic sequence can be used as a method for assembling a multi-layered non-linear optical material. With an initial chromophore layer coupled to a suitable substrate, the resulting plurality of bilayers can be incorporated into a waveguide device. Such devices and related integrated device structures can be prepared as described herein or as, otherwise provided in U.S. Pat. No. 6,033,774 (and in particular columns 15-16 and FIGS. 6a-6d thereof), incorporated by reference herein in its entirety.

In part, the present invention is also a chromophore composition and/or material with non-linear optical properties. Such a composition has the structural formula $(Ch)XR_n$, wherein (Ch)X is a chromophore substructure and X is a heteroatom, R is a trialkylsiloxyalkyl moiety and n is the number of moieties meeting the valence requirement of the corresponding heteroatom. Preferably, the heteroatom is oxygen or nitrogen, but can be any electron-rich heteroatom. Likewise, in preferred embodiments, the chromophore compositions of this invention include and can be represented by any of the structural formulas provided herein. See, in particular, the formulas of FIGS. 1, 2, 11 and 15. With respect to the latter, such substructures can be modified as described herein to provide the inventive chromophore structures. Furthermore, the silyl chemistry of this invention can be applied to other chromophore systems (e.g., FIG. 1) known in the art, such systems synthetically modified as necessary by well-known procedures to take advantage of the self-assembly strategies described herein. For example, various other systems known in the art are described in U.S. Pat. Nos. 5,156,918, 5,834,100 and 6,033,774, each of which is incorporated herein by reference in its entirety, but especially with regard to each respective discussion of the corresponding chromophore and/or conductive molecular components.

In summary, the present invention is a new deposition approach for assembly of covalently bound thin organic films having excellent electro-optic response properties. In particular, the solution-phase protection-deprotection of hydroxyl groups as TBDMS derivatives has found widespread use in organic chemistry but hereto for has not been used as described herein. The selective desilylation of silyl-protected surface functional groups to generate moderately hydrophilic surfaces represents a new application of such protection agents, useful in the efficient assembly of functional, siloxane-based multilayered electro-optic structures. Moreover, as discussed below, UV-vis, XRR, and SHG measurements clearly show that robust second-order chromophoric thin films can be constructed with sub-nm level control of layer dimension and microstructural acentricity completely preserved as layer-by-layer SA progresses.

The noncentrosymmetric alignment of the high-β chromophores separated by a thin polysiloxane film in each identical layer of the superlattice results in very high second-order electro-optic response, competitive with that of the highest efficiency chromophoric LB films and poled polymers. Importantly, electric-field poling is unnecessary to establish bulk second-order nonlinearity, suggesting greatly simplified device fabrication. (Neither electric field poling, poling electrodes, nor electrically matched buffer layers are required). The inventive protection-deprotection layer-by-layer SA strategy can be applied to other chromophore components including high-β heterocylic chromophores, such components as would be known to those skilled in the art, and subsequently toward the integration of such SA materials into device structures.

The chemisorptive siloxane-based layer-by-layer self-assembly techniques described above, yield robust, structurally precise acentric chromophore arrays of self-assembled superlattices (SASs) directly on silicon or related substrates, allowing facile device integration. This modular assembly process offers potentially higher electro-optic (EO) responses ($r_{33}$) and lower dielectric constants ($\in$) than conventional inorganic materials, leading to high estimated EO modulator figures of merit; e.g., $n^3 r_{33} I \in = 20$-140 pm/V for SA films and 10-110 pm/V for poled-polymers vs. 8.7 pm/V for $LiNbO_3$ structures of the prior art.

Moreover, the unique layer-by-layer modularity of the building block incorporation process provides for incorporation or intercalation of other structural and/or functional (e.g., optical, magnetic, mechanical) components or constituents during assembly. In accordance therewith and as described below, the refractive index of an SAS modulator active region can be increased beyond what is possible for typical high-$r_{33}$ organic EO materials of the prior art, thereby enabling simplified device design and performance enhancement by the active layer, as can be considered in terms of: (i) more efficient light confinement due to a large refractive index contrast between the active layer and cladding layers, and (ii) better velocity matching of radio frequency and optical waves for optimum high frequency modulation, and maximizing $n^3r$. As a further departure from the prior art, such improvements in design and performance can be achieved using high impedance (Z) precursors having chemistry compatible with the process schematically represented in FIG. 3.

Accordingly, the present invention can also be directed to one or more methods of assembly, incorporating or intercalating into the lattice structure a component or composition imparting a high impedance factor to the resulting multilayered structure. In preferred embodiments, and as described elsewhere herein, such incorporation can be achieved by depositing such a composition on a capping layer, in accordance with the foregoing methodologies. However, as would be understood by those skilled in the art made aware of this invention, such compositions or layered components could be otherwise intercalated, substantially without adverse impact on the non-linear optical properties of such structures.

Regardless, in preferred embodiments of such assemblies, a Group III metal or a transition metal (e.g. Group IV) composition, and/or a synthetic precursor thereof, having a high Z value is intercalated. Preferred precursors of such compositions include $Ga^{+3}$ and $In^{+3}$ oxides, and $Hf^{+4}$ oxides, including those commercially-available alkoxides; however, various other high-Z value precursors, whether synthetically or commercially-available, can be used with comparable effect. As discussed more fully below, such intercalated compositions are not fully characterized, but appear to be the reaction and/or sorption product of the corresponding precursor and a hydrophillic or siloxane capping component. Regardless, such intercalation is confirmed, with resulting performance properties demonstrated, as shown in several of the following examples.

Preferred embodiments of such an assembly provide, in turn, an inventive non-linear optical material including a molecular composite having first and second capping layers, with a Group III or a Group IV metal composition therebetween. As mentioned above, the compositions can be the sorption and/or reaction product of a Group III or Group IV metal oxide compound with such a capping layer. In accordance with the aforementioned assembly methods, a suitable capping component or material has at least one silicon moiety reactive for self-assembly with a chromophore component. In preferred embodiments, such a capping layer comprises a siloxane. Octachlorotrisiloxane is an especially preferred siloxane capping agent, but other molecular components can be used comparably to provide the desired functional effect.

Regardless, the Group III metal of such a compositional component is preferably Ga or In, with the metal oxide precursor a corresponding alkoxide. However, as discussed above, various other high-Z value precursor compounds can, alternatively, be utilized so as to provide one or more enhanced performance properties of the sort described herein; e.g., refractive index. In accordance therewith, various transition metal compositions imparting a high impedance (Z) factor to the composite can be utilized, such compositions including but not limited to those of Group IV.

A multiple composite can be provided as described above, assembled in conjunction with an acentric chromophore layer. Alternatively, with reference to FIG. 16, such composite can be considered from the perspective of a tetralayer configuration, with corresponding assembly initiated by deposit of a chromophore component on a suitable substrate surface.

In part, the present invention can also include a method of using a Group III or a Group IV metal composition to control the refractive index of an electro-optic material. Such a method includes (i) preparing a layered asymmetric electro-optic composite material having at least one chromophore layer; and (ii) intercalating a Group III or Group IV metal composition into the layered composite. Metal compositions can be intercalated as demonstrated in several of the following examples and detailed descriptions—such a composition, in the context of the present methodologies, the reaction/sorption product of a suitable precursor with a hydrophilic component of the composite material. Intercalation of such a Group III, Group IV or related transition metal composition or a precursor thereof capable of imparting a high or higher impedance factor is shown to affect the refractive index of the electro-optic material. Iterative intercalation during material assembly can be further used to control, tune and/or enhance refractive index, as well as other related physical or performance properties.

BRIEF DESCRIPTIONS OF THE DRAWINGS

FIGS. 4a-c show Linear dependence with the number of bilayers of three physical properties of the chromophoric superlattices: (a) Transmission optical absorbance (abs; arbitrary units) at λ=580 nm. (b) Thickness (d) in Å derived from specular X-ray reflectivity measurements. (c) Square root of the 532 nm SHG intensity ($I^{2\omega}$; arbitrary units).

Figure 5:
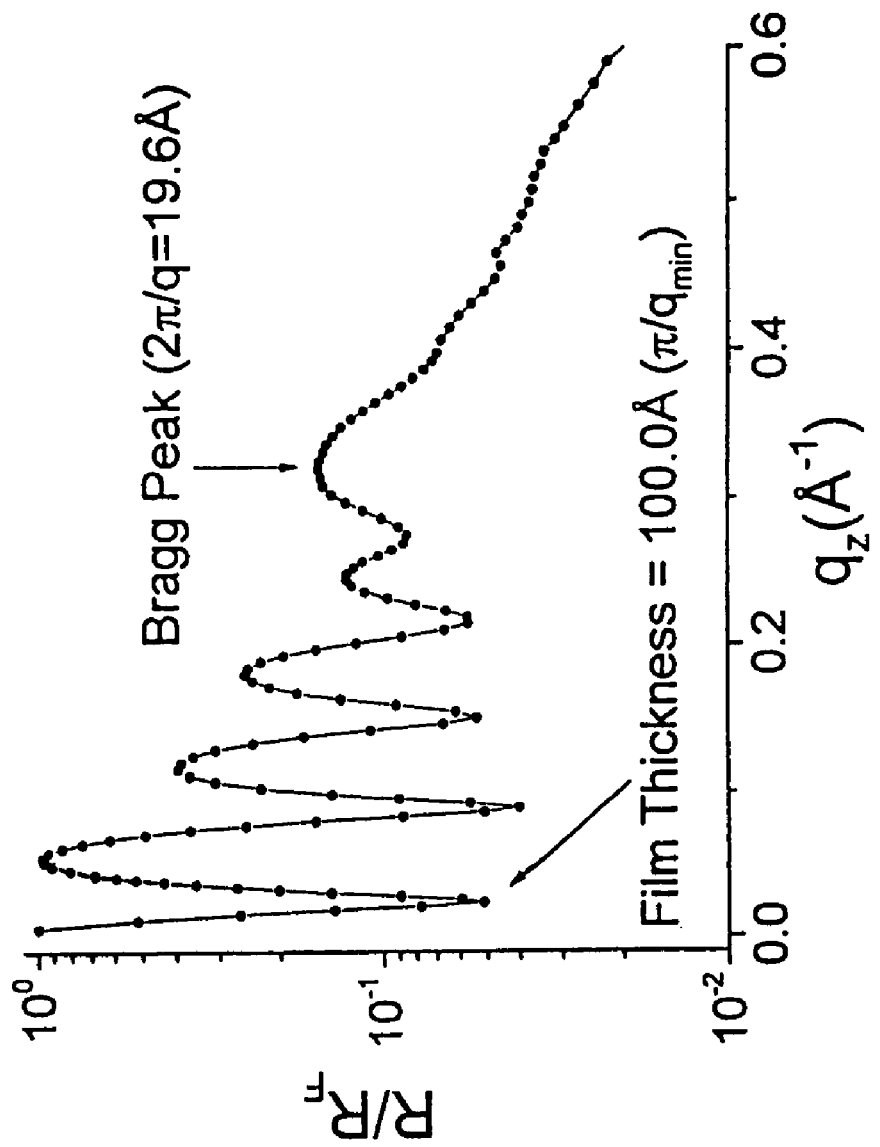

FIG. 5 provides normalized X-ray reflectance plotted versus wave vector for a sample with 5 layers.

Figure 6:
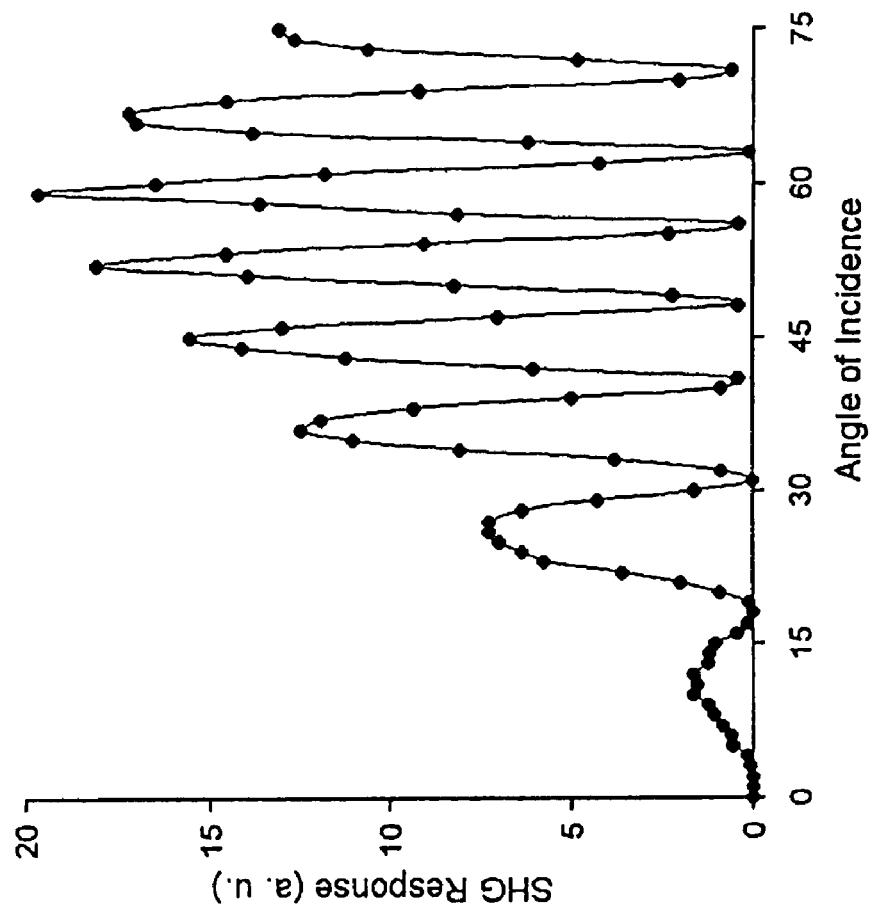

FIG. 6 plots SHG intensity as a function of fundamental beam incident angle from a float glass slide having a SA multilayer (n=5) on either side.

Figure 1:
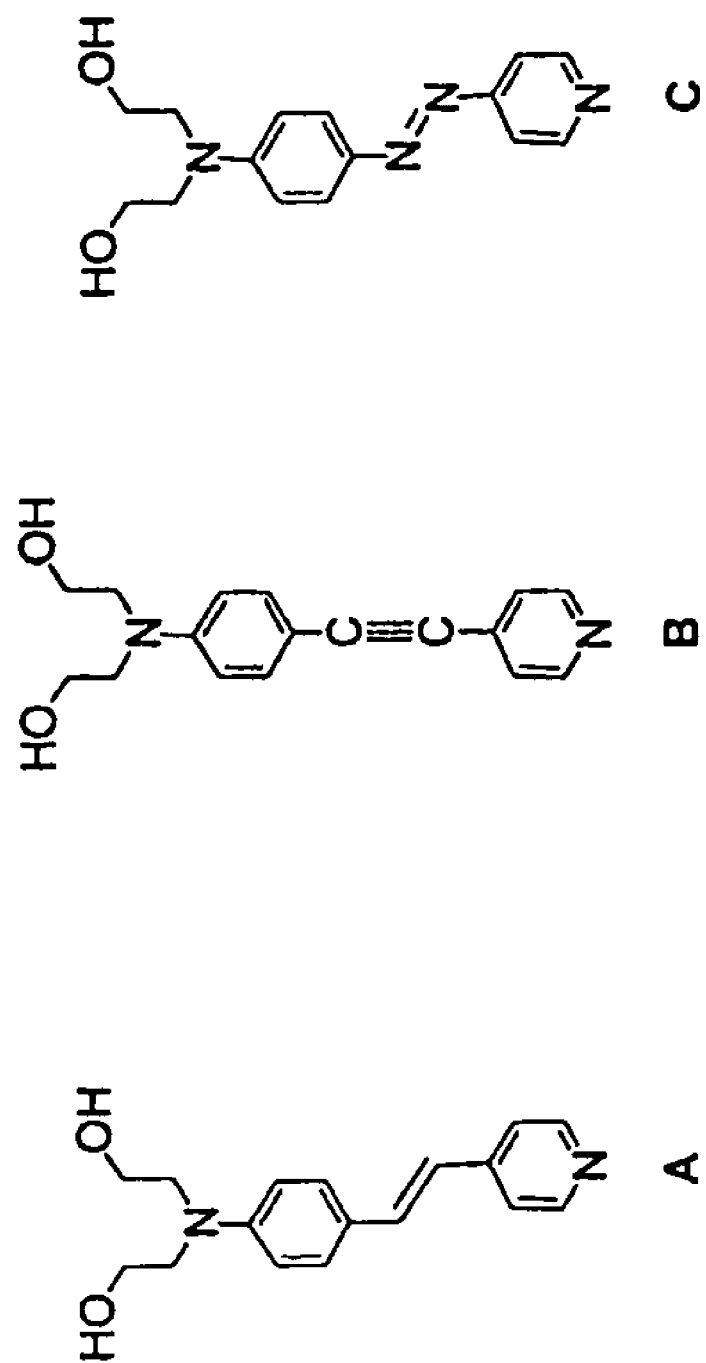
FIG. 1 shows structures of stilbazolium (1A) and related high β-chromophores (1B-C) of the type which can be silylated and used in conjunction with the methods of this invention.
Figure 2:
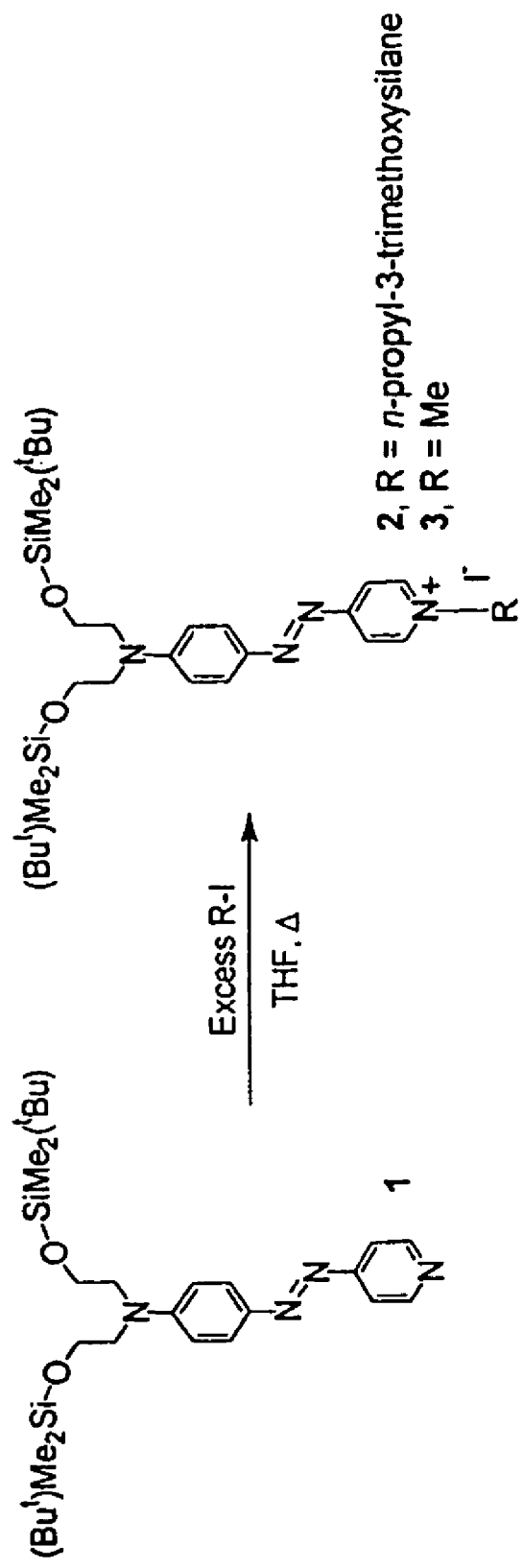
FIG. 2 shows the reaction of the chromophore precursor 1A with excess of 1-iodo-n-propyl-3-trimethoxysilane or MeI in dry THF at 90° C. to give 2A and 3A, respectively.
Figure 7:
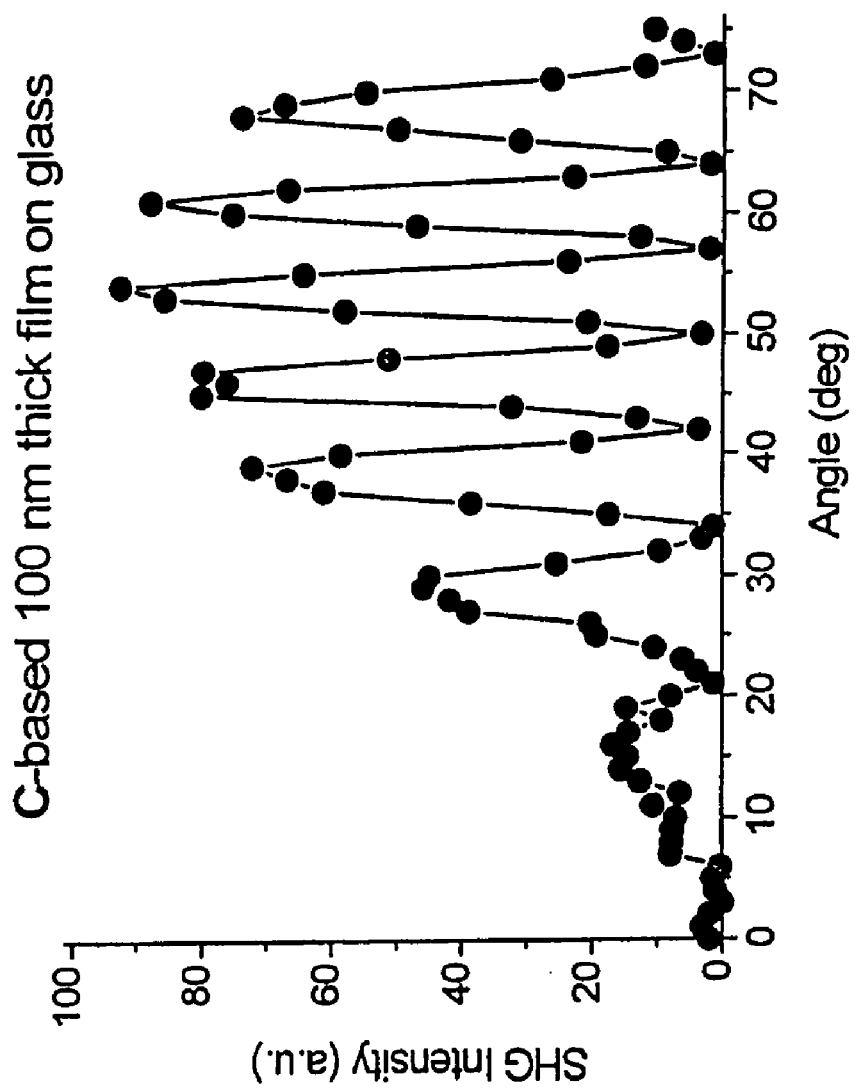

FIG. 7 shows a characteristic second harmonic generation (SHG) interference pattern, as demonstrated with a 100 nm-thick C-based film (FIGS. 1 and 2).

Figure 8:
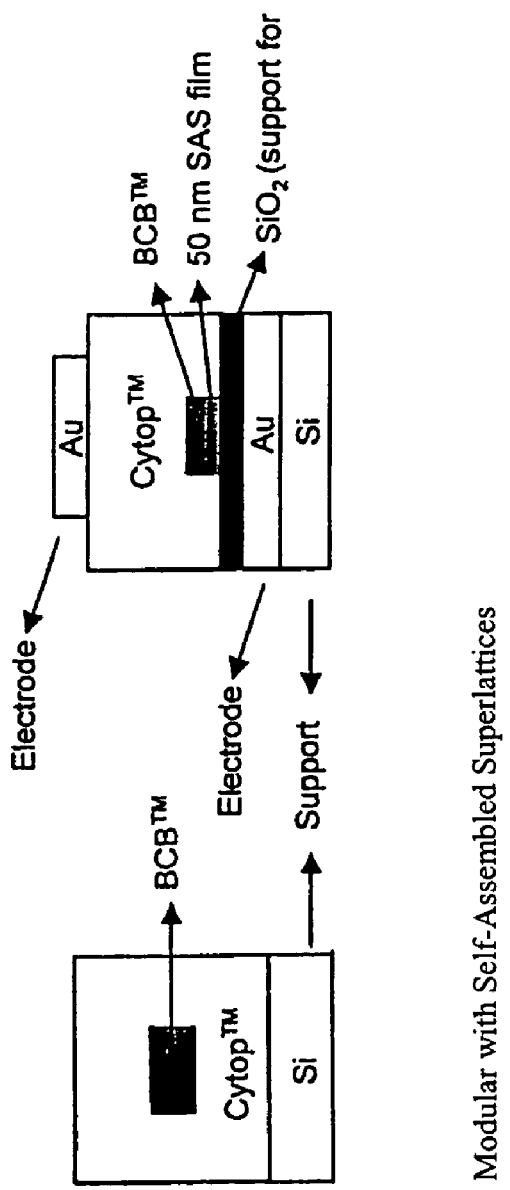

FIG. 8 compares, schematically, integration of large response electro-optic materials into device structures.

Figure 9:
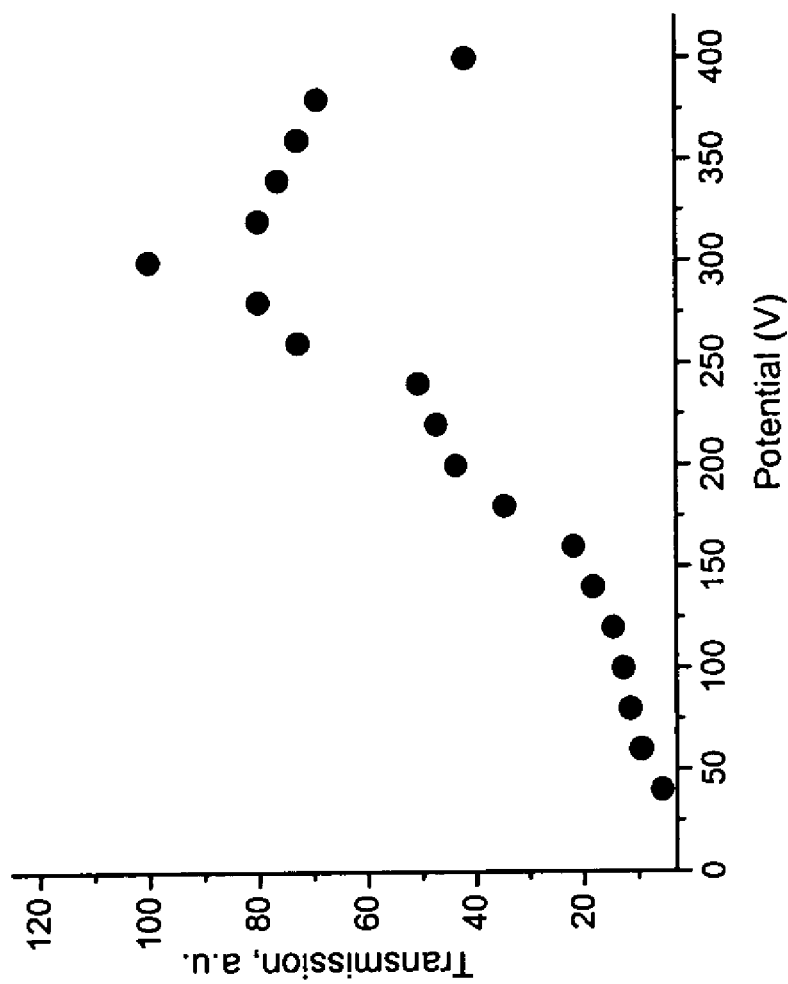

FIG. 9 illustrates electro-optic modulation with a C-based 50 nm thick film of this invention (see, also, FIGS. 1 and 2).

Figure 10:
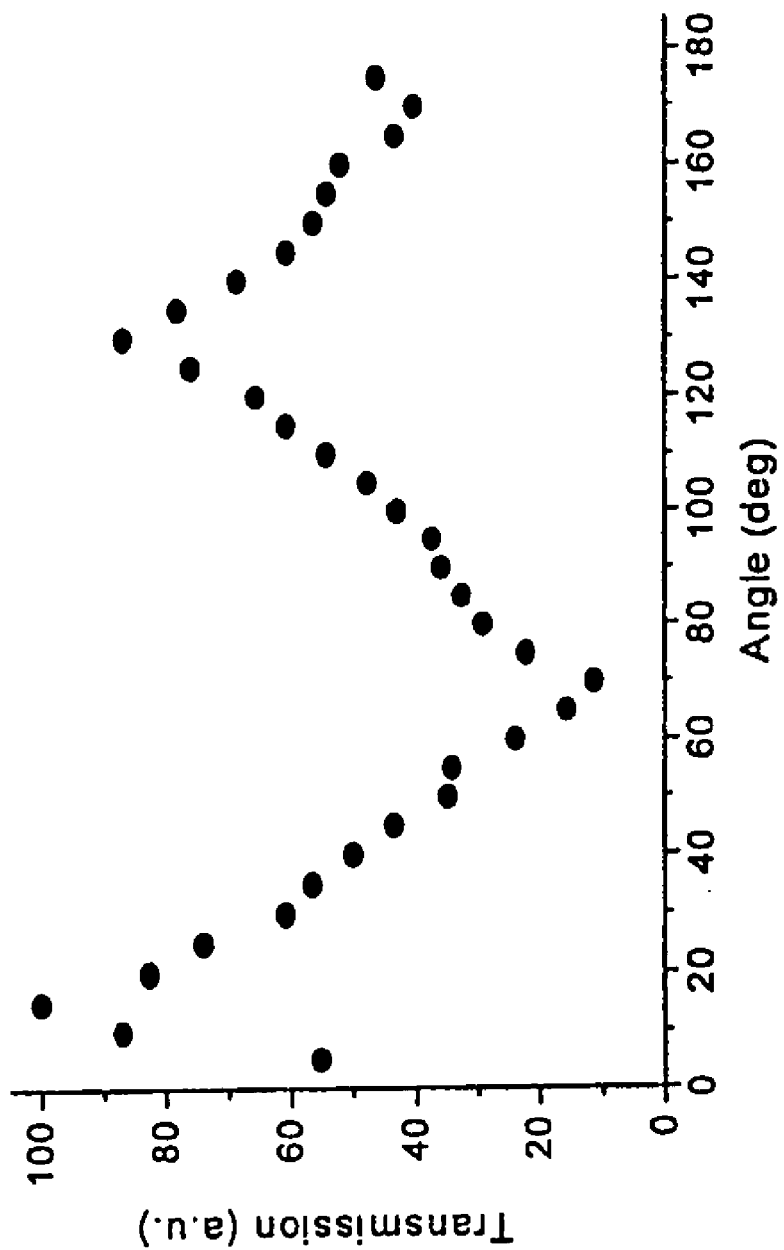

FIG. 10 demonstrates the transparency of the prototype electro-optic modulator of the type illustrated in FIG. 8.

Figure 11:
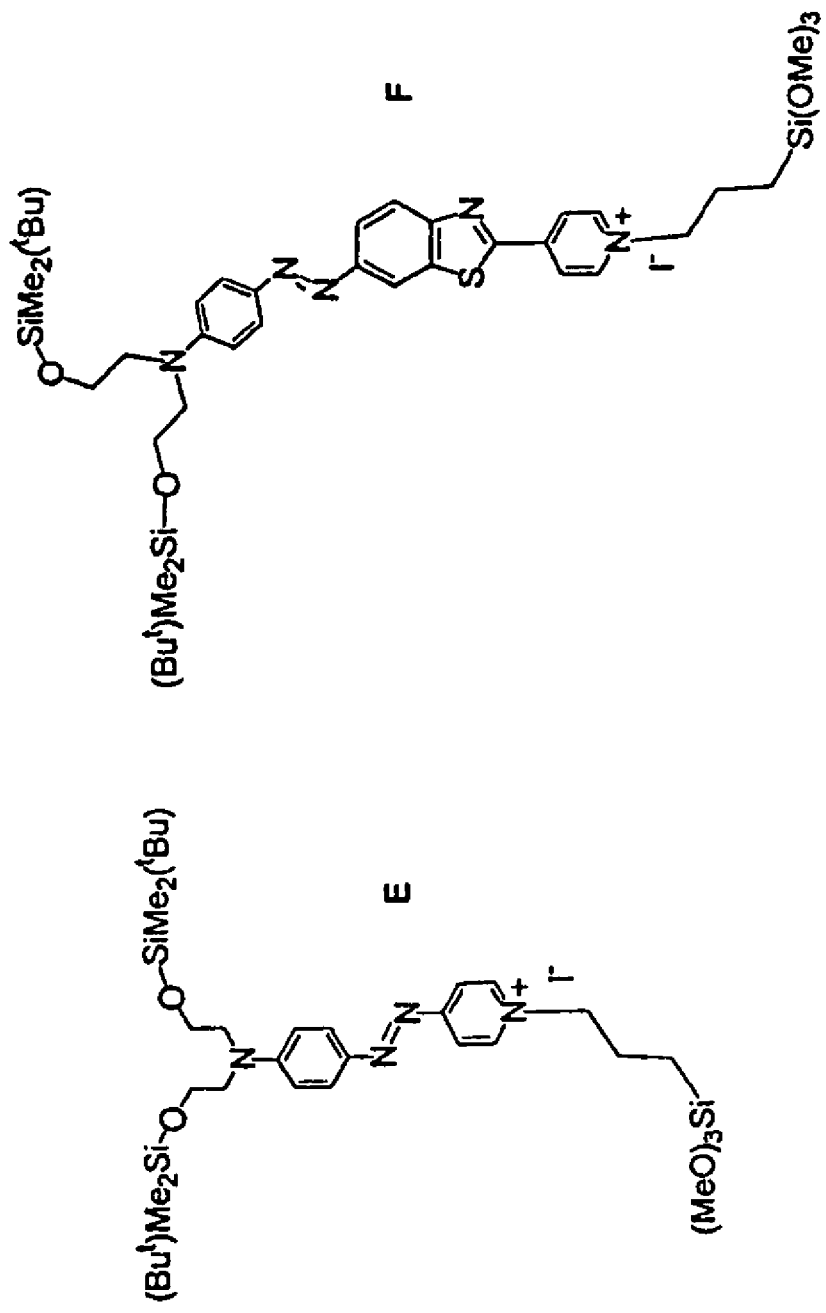

FIG. 11 shows, structurally, other chromophores of the type which can be devised in accordance with the present invention and used with the methods described herein.

Figure 12:
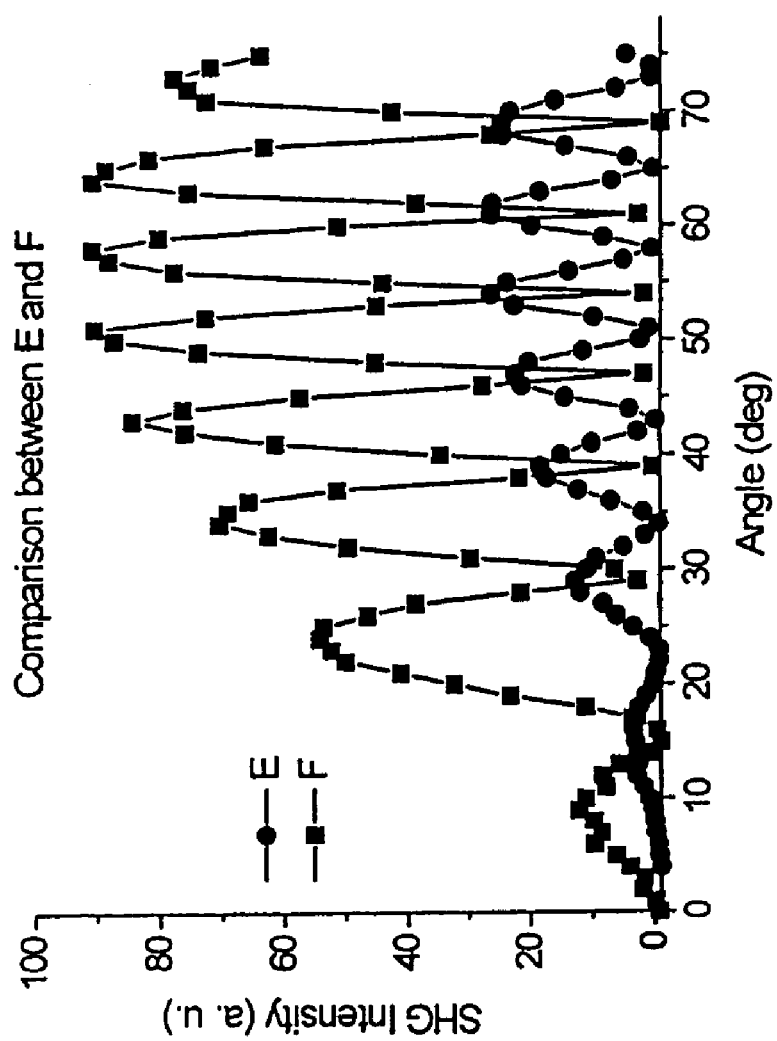

FIG. 12 compares, with reference to FIG. 11, characteristic second harmonic generation (SHG) interference pattern for chromophore E and F-based films.

Figure 13:
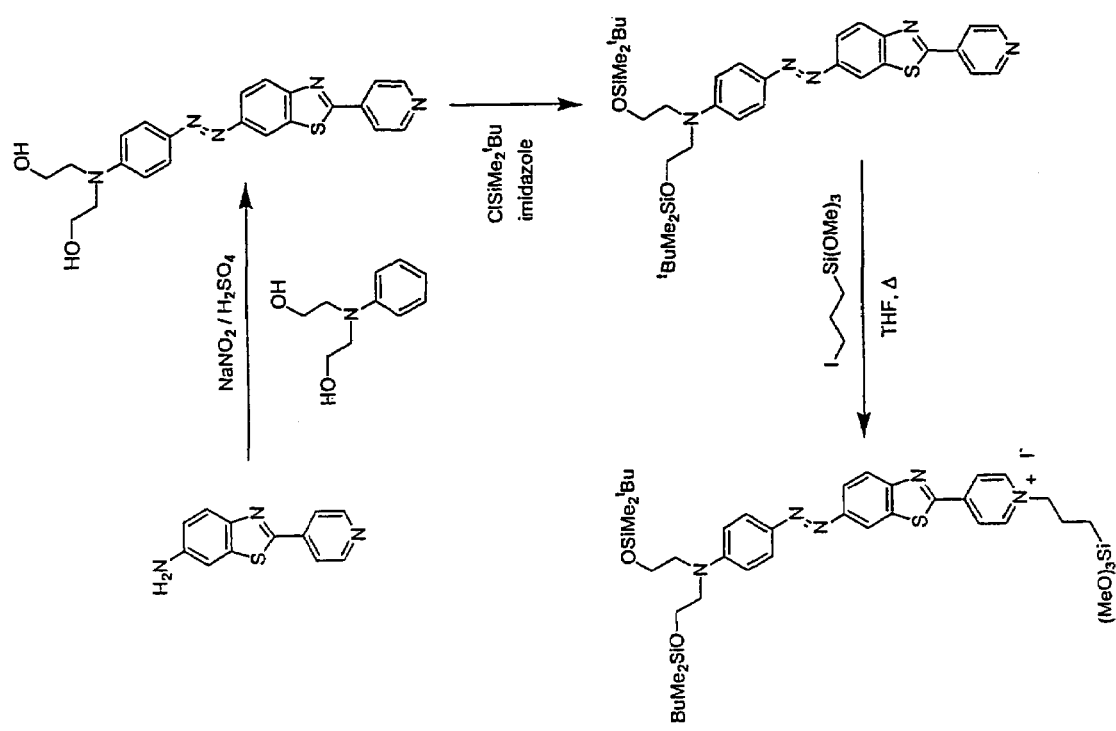

FIG. 13 illustrates a synthetic procedure enroute to chromophore F of FIG. 11.

Figure 14:
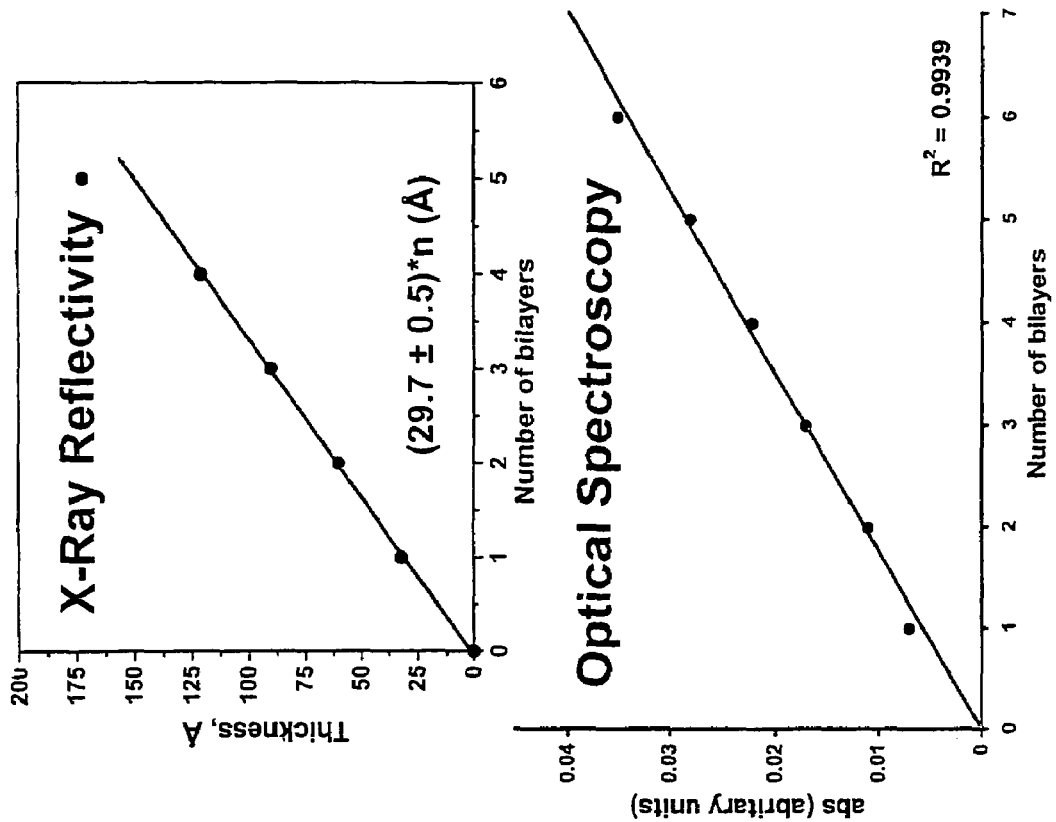
Figure 14:
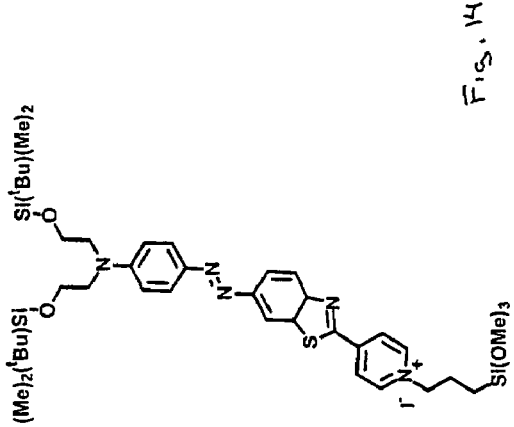

FIG. 14 provides physiochemical data characterizing chromophore F.

Figure 15:
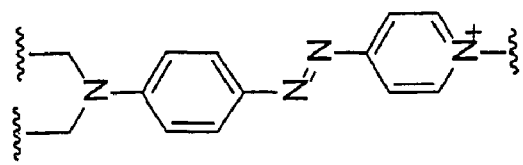
Figure 15:
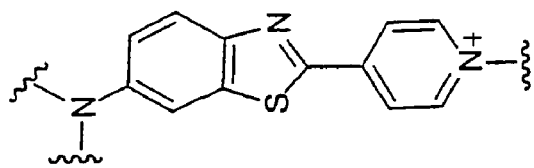
Figure 15:
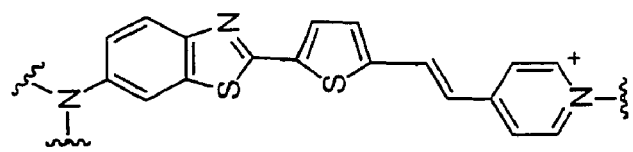
Figure 15:
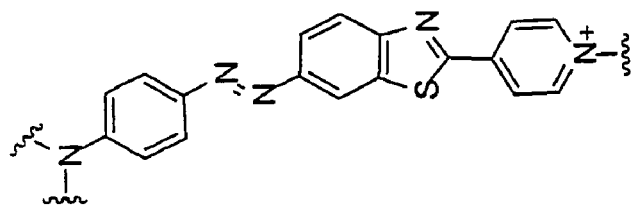

FIG. 15 illustrates other chromophore substructures of the type which can be modified in accordance with this invention and used as described herein.

Figure 16:
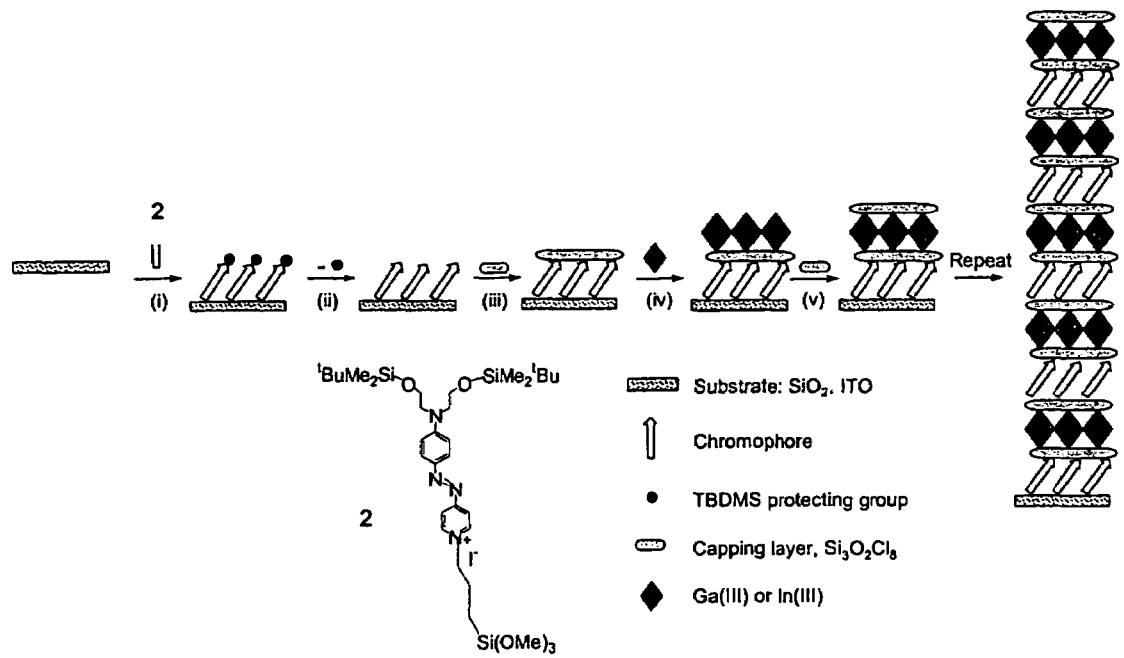

FIG. 16 is a schematic illustration of the layer-by-layer self-assembly of a representative chromophoric superlattice with incorporation of refractive index modifying group 13 oxide layers.

FIG. 17 shows dependence with the number of layers for the Ga (●) and In (△) hybrid SAS films of three chromophoric superlattice physical properties: (A) Transmission optical absorbance (abs; arbitrary units) at λ=557 nm for Ga and λ=564 nm for In. (B) Thickness (d) in Å derived from specular X-ray reflectivity measurements. (C) Square-root of the 532 nm SHG intensity ($I^{2\omega}$; arbitrary units). The lines through the data points are fit by linear regression.

FIG. 18 graphically illustrates four chromophoric superlattice physical properties: (A) Normalized X-ray reflectivity (XRR) plotted versus wave vector for a hybrid SAS sample with 4-layers, (B) XRR-derived film roughness ($\sigma_{film-air}/T_{film}$) as a function of the number of layers. (C) Ellipsometry-derived refractive indices of Ga, In, and "all-organic" chromophore 2-based films. (D) SHG response as a function of fundamental beam incident angle from a float glass slide having a tetralayer film on either side.

Figure 19:
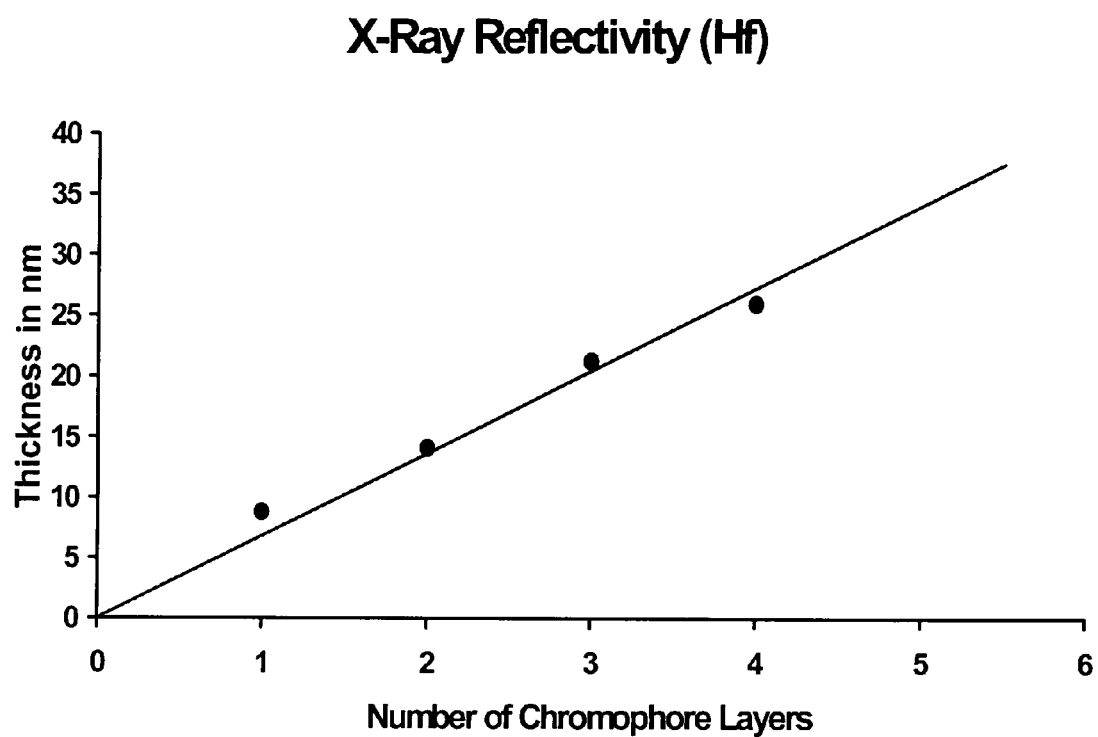

FIG. 19 shows film thickness (d), in nm, as a function of the number of chromophore (and tetralayers), as derived from specular XRR measurements.

DETAILED DESCRIPTION OF THE INVENTION

The generally applicable SA method of this invention involves the iterative combination of: (i) covalent chemisorption of polar monolayers of high-β chromophores (see FIGS. 1 and 2, for instance), (ii) selective removal of tert-butyldimethylsilyl (TBDMS) protecting groups from the surface bound chromophore films with tetra-n-butylammonium fluoride ("Bu₄NF) in THF to generate a large density of reactive hydroxyl sites, and (iii) reaction of each 'deprotected' chromophore layer with a heptane solution of octachlorotrisiloxane (150:1 v/v). This 'capping' step deposits a thin polysiloxane film (preferrably ~8 Å thick) and promotes formation of an acentric multilayer structure since it appears to provide structural stabilization/planarization via interchromophore crosslinking. (W. Lin, W. Lin, G. K. Wong, T. J. Marks, *J. Am. Chem. Soc.* 1996, 118, 8034-8042; W. Lin, S. Yitzchaik, W. Lin, A. Malik, M. K. Durbin, A. G. Richter, G. K. Wong, P. Dutta, T. J. Marks, *Angew. Chem. Int. Ed. Engl.* 1995 34, 1497-1499.) The present liquid-solid interface layer-by-layer construction can be carried out conveniently in a single reaction vessel, whether by batch or another suitable process. The thermally and photochemically robust thin film superlattices exhibit very high second-order responses ($\chi^{(2)}$ as large as ~220 pm/V), adhere strongly to the sodium lime glass, silicon, or indium tin oxide-coated glass (ITO) substrates, and are insoluble in common organic solvents.

With reference to several examples and figures, the present invention includes preparation of 50 and 100 nm thick C-based (see FIGS. 1 and 2) films on sodium lime glass, silicon, indium tin oxide-coated glass (ITO), and SiO₂-coated gold, and the integration of these electro-optic materials into modulator-type structures. The thermally and photochemically robust thin film superlattices adhere strongly to the substrates, and are insoluble in common organic solvents (e.g.: toluene, methanol, acetone, tetrahydrofuran, pentane or heptane). The structural regularity of the films has been studied by angle-dependent polarized second harmonic generation (SHG). The polarized angle-dependent second harmonic generation measurements were made in the transmission mode using the $\lambda_o$=1064 nm output wavelength of a Q-switched Nd:YAG laser. The characteristic second harmonic generation interference pattern clearly shows that the quality and uniformity of the organic films is identical on both sides of the float glass substrate. (See FIG. 7)

More specifically, the present invention can also include a facile, efficient all-"wet-chemical" synthetic approach and/or method relating to enhancement, control and/or tuning of SAS refractive index by intercalating metal oxide sheets while retaining acentricy, large EO response, and microstructural regularity. Such a method can include, iterratively, in preferred embodiments: (i) providing and/or chemisorption of a protected chromophore having a large molecular hyperpolarizability (β), (ii) removal of the protecting groups to generate a large density of reactive hydroxyl sites, (iii) capping (e.g., chemisorption, exposure to ambient, thermal cure) of each 'deprotected' chromophore layer with a poly-siloxane, such as but not limited to $Si_3O_2Cl_8$, (iv) deposition (e.g., chemisorption, exposure to ambient, thermal cure) of one or more sheets from THF or otherwise suitable solutions of transition metal or Group III metal compositions such as but not limited to $Hf(i-O_3H_7)_4$, $Ga(i-OC_3H_7)_3$ or $In(i-OC_3H_7)_3$, and (v) capping (chemisorption, exposure to ambient, thermal cure) of the oxy-group 13 surface with a polysiloxane. Chromophore deposition and hydroxyl-deprotection steps are as characterized above. Steps (iii) and (v) result in the formation of dense hydrophilic polysiloxane films ($\rho_{(siO2)x}/\rho_{(Si/SiO2)}$~0.85 and $\theta^a_{(aq)}$<30°), and assist in stabilizing acentric SAS microstructures. J. E. Malinsky, G. E. Jabbour, S. E. Shaheen, J. D. Anderson, A. G. Richter, T. J. Marks, N. R. Armstrong, B. Kippelen, P. Dutta, N. Peyghambarian, *Adv. Mater.* 1999, 11, 227-231. W. Lin, T.-L. Lee, P. F. Lyman, J. Lee, M. J. Bedzyk, T. J. Marks *J. Am. Chem. Soc.* 1997, 119, 2205-2211. S. Yitzchaik, T. J. Marks, *Acc. Chem. Res.* 1996, 29, 197-202.

However, the chemisorption of gallium and indium alkoxides or related Group IV or transition metal precursors on a hydrophilic surface (step iv) has not fully been characterized. While formation of oligomers is often observed, for example, upon reaction of gallium or indium alkoxides with protic reagents in solution, this invention is not limited to any one theory or mode of operation. The reaction of the such precursors with a hydrophilic surface (and perhaps adventitious adsorbed H₂O) can be considered to provide a corresponding metalloxane and/or oligomeric oxide/alkoxide sorption product, with or without solvent coordination. In any event, the thermally and photochemically robust hybrid thin films resulting therefrom adhere strongly to the glass, silicon, or indium tin oxide-coated glass (ITO) substrates (as demonstrated by the standard Scotch™ tape test), and are insoluble in common organic solvents.

EXAMPLES OF THE INVENTION

The following non-limiting examples and data illustrate various aspects and features relating to the compositions, materials, devices and/or methods of the present invention, including the assembly of chromophoric and non-linear optic films and materials as are available through the synthetic methodology described herein. In comparison with the prior art, the present methods and materials/devices provide results and data which are surprising, unexpected and contrary to the prior art. While the utility of this invention is illustrated through the use of several films, materials and/or devices and the molecular components thereof, it will be understood by those skilled in the art that comparable results are obtainable with various other compositions, films and/or devices, commensurate with the scope of this invention.

As shown below, the iterative chemisorptive SA process and the structural regularity of the resulting multilayers have been unambiguously characterized by a full complement of physicochemical techniques: optical transmission spectroscopy, advancing aqueous contact angle (CA) measurements, X-ray photoelectron spectroscopy (XPS), X-ray reflectivity (XRR), and angle-dependent polarized second harmonic generation (SHG). The XRR measurements are crucial in establishing film sub-nanostructural order, thickness, surface roughness, and density.

All reactions were carried out under inert atmosphere in a nitrogen filled dry-box or using standard schlenk techniques. Solvents were dried, distilled, and degassed before use. Alkoxides $Hf(i-O_3H_7)_4 \cdot HOC_3H_7$, $Ga(i-OC_3H_7)_3 \cdot HOC_3H_7$, $In(i-OC_3H_7)_3 \cdot HOC_3H_7$ and siloxane $Si_3O_2Cl_8$ were purchased from Alfa and Gelest, respectively. Toluene, pentane, and heptane were dried over Na/K and distilled under nitrogen. Elemental analyses were carried out at Midwest Microlab, LLC, Indianapolis, USA. The reagent 3-iodo-n-propyltrimethoxysilane was purchased from Gelest, Inc, PA (USA). Octachlorotrisiloxane was prepared according to a literature procedure. (Formation of octachlorotrisiloxane: W. C. Schumb, A. J. Stevens, *J. Am. Chem. Soc.* 1947 69, 726-726.) Silicon wafers (Semiconductor Processing Company) and sodium lime glass were cleaned by immersion in a freshly prepared 'piranha' solution (conc. $H_2SO_4:H_2O_2$ 30%=7:3 v/v) at 80° C. for at least 45 min. This solution is a very strong oxidizing agent and should be handled carefully. After cooling to room temperature, the slides were rinsed repeatedly with de-ionized (DI) water and subjected to an RCA-type cleaning procedure ($H_2O:H_2O_2$ 30%:$NH_4OH$ 5:1:1 v/v/v, sonicated at room temperature for at least 45 min). The substrates were then rinsed with DI water and dried in an oven overnight at 115° C. ITO glass sheets were used for XPS measurements and were purchased from Donnelly Corporation and cut into 2.52×2.54 cm square pieces. The ITO substrates were sequentially washed with isopropyl alcohol, acetone, and methanol in an ultrasonic bath for at least 30 min, and dried in an oven overnight at 115° C. Advancing aqueous contact angles ($\theta_a$) were measured on a standard goniometer bench fitted with a Teflon micrometer syringe at room temperature. All reported values are the average of at least 5 measurements taken on both sides of the glass substrates.

Spectroscopic Analysis. $^1H$ NMR spectra were recorded at 300.1 MHz on a Varian Gemini 300 spectrometer. All chemical shifts ($\delta$) are reported in ppm and coupling constants (J) are in Hz. The $^1H$ NMR chemical shifts are relative to tetramethylsilane (TMS). The resonance of the residual protons of the deuterated solvent was used as an internal standard ($\delta$2.05 acetone; $\delta$7.26 chloroform). UV-vis spectra were recorded with a Cary 1E spectrophotometer. Polarized angle-depended SHG measurements were made in the transmission mode using the 1064 nm output of a Q-switched Nd:YAG laser operated at 10 Hz with a pulse width of 3 ns. The details of the setup can be found elsewhere. (S. Yitzchaik, S. B. Roscoe, A. K. Kakker, D. S. Allan, T. J. Marks, Z. Xu, T. Zhang, W. Lin, G. K. Wong, *J. Phys. Chem.* 1993 97, 6958-6960.) The data were reproducible over a range of points on the sodium lime glass and ITO samples, and were directly calibrated against those from a Y-cut α-quartz reference. The intensity variation for samples prepared simultaneously was less than 10%. The X-ray reflectivity measurements were performed at Beam Line X23B of the National Synchrotron Light Source at Brookhaven National Laboratory in Upton, N.Y., USA. Details of the data acquisition and analysis procedure were reported previously. (A. Malik, W. Lin, M. K. Durbin, T. J. Marks, P. Dutta, *J. Chem. Phys.* 1997 107, 645-651.) XPS measurements were carried out using the Al Kα source of a VG ESCALAB MKII photoelectron spectrometer at the University of Arizona in Tucson, Ariz., USA.

Example 1

Synthesis of 4-[[4-[N,N-bis((tert-butyldimethylsiloxy) ethyl)amino]phenyl]azo-1-alkyl-pyridinium iodide salt (alkyl=methyl, n-propyl-3-trimethoxysilane). For Cpd2 (FIG. 2). A dry THF solution (15 mL) of 1 (300 mg, 0.583 mmol) and 6.5 equiv of 3-iodo-n-propyltrimethoxysilane (750 μL, 3.81 mmol) was loaded into pressure vessel (25 mL) and heated overnight at 80° C. under Ar. The THF and the excess 1-iodo-n-propyl-3-trimethoxysilane were then removed under high vacuum at 80° C. affording compound 3 as a dark purple solid in quantitave yield. $^1H$ NMR analysis of the reaction mixture after 1 h indicated ~15% formation of 2 and starting materials. No other products were observed. Anal. Calcd. for $C_{33}H_{61}I_1N_4O_5Si_3$: Calcd C, 49.24; H, 7.64. Found: C, 49.64; H, 7.35. UV-vis (toluene): $\lambda_{max}$=536 nm. $^1H$ NMR ($CD_3COCD_3$): δ9.21 (d, $^3J_{HH}$=7.1 Hz, 2H, ArH), 8.25 (d, $^3J_{HH}$=6.7 Hz, 2H, ArH), 8.00 (d, $^3J_{HH}$=9.0 Hz, 2H, ArH), 7.17 (d, $^3J_{HH}$=9.5 Hz, 2H, ArH), 4.83 (t, $^3J_{HH}$=7.3 Hz, 2H, N—$CH_2$), 4.02 (t, $J_{HH}$=5.0 Hz, 4H, $OCH_2$) 3.94 (t$^3$, $J_{HH}$=5.0 Hz, 4H, $NCH_2$), 3.57 (s, 9H, $Si(OCH_3)_3$), 2.11 (m, 2H, $CH_2$), 0.91 (s, 18H, $C(CH_3)_3$), 0.78 (t, $^3J_{HH}$=8.4 Hz, 2H, $CH_2Si$), 00.7 (s, 6H, $SiCH_3$). For Cpd3. A THF-$d_8$ solution (1.5 mL) of 1 (60 mg, 0.117 mmol) and MeI (100 μL, 1.61 mmol) was loaded into a 5-mm screwcap NMR tube and heated overnight at 80° C. The resulting dark purple solution was analyzed by $^1H$ NMR, showing unreacted MeI and the selective formation of 3. No other products were observed. Compound 3 was obtained quantitatively as a dark purple solid after evaporation of the solvent and the excess of MeI. Anal. Calcd. for $C_{28}H_{49}I_1N_2O_2Si_2H_2O$: Cald: C, 49.56; H, 7.32. Found: C, 49.84; H, 7.62. UV-vis (toluene): $\lambda_{max}$=536 nm. Mp=158° C. $^1H$ NMR ($CDCl_3$): δ9.49 (d, $^3J_{HH}$=6.8 Hz, 2H, ArH), 8.08 (d, $^3J_{HH}$=6.9 Hz, 2H, ArH), 7.90 (d, $^3J_{HH}$=9.3 Hz, 2H, ArH), 7.07 (d, $^3J_{HH}$=9.4 Hz, 2H, ArH), 4.65 s, 3H, N—$CH_3$), 3.95 (t, $^3J_{HH}$=5.1 Hz, 4H, $OCH_2$), 3.85 (t, $^3J_{HH}$=4.8 Hz, 4H, $NCH_2$), 0.90 (s, 18H, $C(CH_3)_3$), 0.06 (s. 12H, $CH_3$).

Example 2

Figure 3:
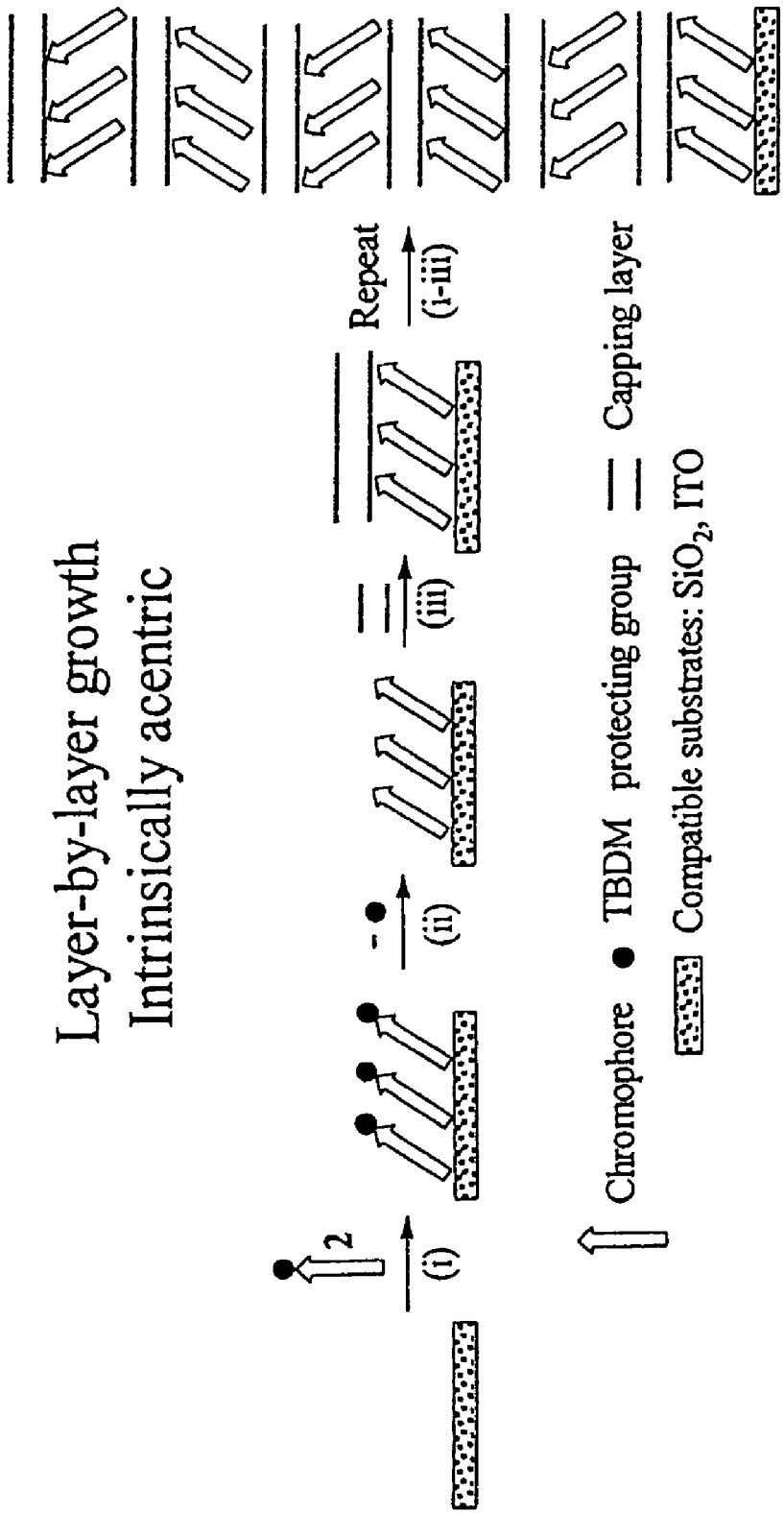
FIG. 3 is a schematic representation of the self-assembly of covalent 2-based chromophoric superlattices by deprotection of the TBDMS-derivatized hydroxyl groups with "Bu₄NF and treatment of the resulting film with octachlorotrisiloxane.

Formation of chromophoric superlattices: (i) Self-assembly of Cpd 2 (FIG. 3). Under an Ar atmosphere, the freshly cleaned ITO, sodium lime glass, and/or silicon substrates were loaded into a Teflon sample holder and totally immersed in a dark purple toluene solution of 2 (2.0 mM) for at least 12 h at 90° C. After cooling the Schlenck-type reaction vessel to 25° C., the purple substrates were thoroughly washed with excess toluene and THF, sonicated in acetone for at least 5 min., and dried at room temperature under high vacuum. Longer reaction times (up to 40 h) and other organic solvents for rinsing such as hexane, pentane, or methanol can be used as well. (ii) Deprotection of the TBDMS derivatized hydroxyl moieties. The substrates were immersed in a freshly prepared THF solution of $^n$BuN$_4$F (0.06 mM) for 4 min, washed with excess THF and MeOH, sonicated in acetone for at least 5 min., and dried at room temperature under high vacuum. (iii) Self-assembly of octachlorotrisiloxane. Under an Ar atmosphere, the substrates were immersed in a dry heptane solution of octachlorotrisiloxane (34 mM) for 30 min, washed twice with dry pentane, sonicated in acetone for 15 min, and dried at 115° C. for 10 min. The substrates were cooled to 25° C. under high vacuum or by passing a gentle stream of dry Ar through the reaction vessel before repeating step (i). The chromophore 2 and octachlorotrisiloxane solutions can be used for at least 6 layers.

Example 3

Reaction of chromophore precursor 4-[[4-[N,N-bis((tert-butyldimethylsiloxy)-ethyl)amino]phenyl]azo]pyridine 1 (180 mM) with a 7-fold excess of 1-iodo-n-propyl-3-trimethoxysilane in dry THF at 90° C. results in quantitative formation of the new purple 4-[[(4-(N,N-bis((tert-butyldimethylsiloxy)ethyl)amino]-phenyl]azo]-1-n-propyl-3-trimethoxysilane-pyridinium iodide salt 2 (FIG. 2). The TBDMS functionality is used for protection of the hydroxyl groups and is introduced with tert-butyldimethylchlorosilane in the presence of imidazole. Compound 2 was fully characterized by $^1$H NMR and UV-vis spectroscopy, and by elemental analysis. Moreover, the analogous 1-methylpyridinium salt (Cpd 3, FIG. 2) can be readily prepared using methyl iodide and has similar spectroscopic properties. For instance, the UV-vis spectra of Cpds 2 and 3 in toluene exhibit a characteristic red-shift of the charge-transfer (CT) band to $\lambda_{max}$=536 nm in comparison to chromophore precursor 1 ($\Delta\delta_{max}$~93 nm).

Example 4

The deprotection of the TBDMS derivatized hydroxyl groups (step ii) was examined by specular XRR, XPS, and CA measurements, which unequivocally reveal the removal of the TBDMS groups. XRR and XPS measurements on a Cpd 2-based monolayer reveal an initial film thickness of 14.5±0.5 Å and a Si/N ratio of 0.75, respectively. Treatment of this monolayer with $^n$Bu$_4$NF (0.06 mM) in THF for 4 min. at 25° C. results in a decrease of: (i) film thickness by ~2.6 Å to 11.9±0.5 Å, and (ii) total number of electrons per unit area by ~16%. XPS measurements on the deprotected monolayer reveal a Si/N ratio of 0.42. Complete removal of the TBDMS group is expected to result in a decrease of the total number of electrons per unit area of ~32% and a Si/N ratio of 0.25. Therefore, our observations indicate the loss of ~50% of the TBDMS protecting groups. Further evidence of hydroxyl functionality deprotection is obtained by CA measurements which show a decrease in $\theta_a$ of ~35° to 51±4°. It is known that in solution, treatment of 2 with $^n$Bu$_4$NF at 25° C. results in quantitative formation of 4-[[4-[N,N-bis(hydroxyethyl)amino]phenyl]azo]pyridine by selective cleavage of both Si—O bonds. The two TBDMS groups of each surface bound chromophore 2 may be chemically inequivalent (i.e., only one TBDMS group is present near the surface), resulting in a sterically less accessible TBDMS moiety for nucleophilic F attack. In support of this hypothesis, XRR reveals that the surface roughness ($\sigma_{film-air}$) decreases by ~1.3 Å to 3.8±0.5 Å upon treatment of a 1-based monolayer with $^n$Bu$_4$NF. Remarkably, the XRR-derived C$\sigma_{film-air}$ width of the 'deprotected' 2-based monolayer is comparable to that of a highly ordered self-assembled octadecyltrichlorosilane film on silicon, demonstrating that this new 'protection-deprotection' SA approach results in formation of smooth, well-organized films.

Example 5

The linear dependence of both the optical HOMO-LUMO CT excitation absorbance at $\lambda_{max}$=580 nm and the XRR-derived film thickness on the number of assembled bilayers unambiguously demonstrates that equal populations of uniformly orientated chromophores are deposited in each layer (FIGS. 2a,b). From the slope of the XRR measurements, an average interlayer spacing of 20.52±10.45 Å can be deduced. A maximum in the reflected intensity at $K_z$=0.32 Å$^{-1}$ is observed, which corresponds to a 'Bragg' peak due to scattering from essentially identical individual chromophore layers (FIG. 3). The interlayer spacing calculated from this peak is 19.6±1 Å. Advancing aqueous CA measurements are in accord with expected surface wettabilities and repeat regularly in each step of the layer-by-layer SA process: TBDMS (i), ~86°; ethanolamine (ii), ~50°; —Si—OH (iii), ~25°. (W. Lin, W. Lin, G. K. Wong, T. J. Marks, *J. Am. Chem. Soc.* 1996 118, 8034-8042; W. Lin, S. Yitzchaik, W. Lin, A. Malik, M. K. Durbin, A. G. Richter, G. K. Wong, P. Dutta, T. J. Marks, *Angew. Chem. Int. Ed. Engl.* 1995 34, 1497-1499.)

Example 6

Figure 4:
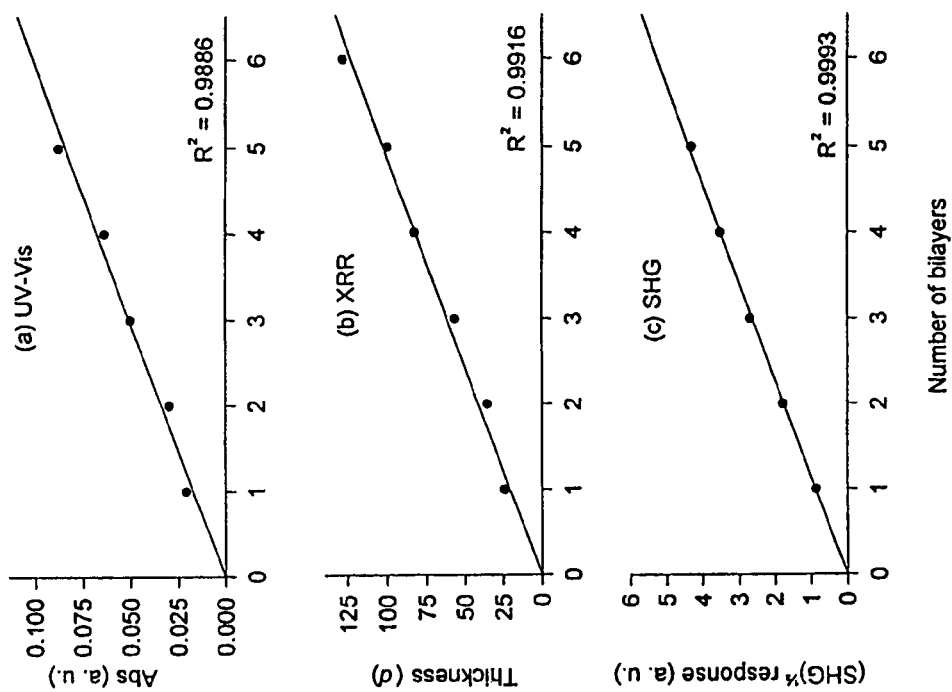

Angle-dependent SHG measurements are an excellent tool for characterization and identification of self-assembled (aminophenyl)azo]pyridinium mono- and multilayer films. Polarized angle-dependent SHG measurements on the present films were made in the transmission mode using the $\lambda_o$, =1064 nm output wavelength of a Q-switched Nd:YAG laser. Details of the experimental set-up have been reported. The intensity of the SHG light ($I^{2\omega}$) from a regular multilayered structure should scale quadratically with the number of layers (N. Bloembergen, P. S. Pershan, *Phys. Rev.* 1962 128, 606-622), because the wavelength of the incident light is large compared to the average film thickness (l=20.52(±0.45)×n Å; n=number of layers). The observed linear dependence of the square root of the second harmonic response on the number of layers indicates both uniform chromophore alignment and structural regularity in layer thicknesses (FIG. 2c), which is full in agreement with the UV-vis and XRR data (FIGS. 2a,b; vide supra). The characteristic SHG interference pattern for each layer clearly shows that the quality and uniformity of the organic film is identical on both sides of the float glass substrate and can be fit to eq 1, where $\psi$ is the average orientation angle between the surface normal and the principal molecular tensor component (FIG. 4, n=5). A very large bulk second-order nonlinear susceptibility response, $\chi^{(2)}$zzz~5.3×10$^{-7}$ esu (~220 pm/V), and an average chromophore orientation angle, $\psi$~36°, is obtained by calibrating the SHG data against quartz. An average chromophore surface density $N_S$ of ~2×10$^{14}$ molecules/cm$^2$ is estimated for each layer using the ZINDO-derived molecular hyperpolarizability ($\beta$zzz) value of 983.70×10$^{-32}$ esu at 1064 nm (W. Lin, W. Lin, G. K. Wong, T. J. Marks, *J. Am. Chem. Soc.* 1996 118, 8034-8042), the experimental $\chi^2$zzz~5.3×10$^{-7}$ esu, and the average interlayer spacing l of 20.52±0.45 Å (eq 2). The estimated $N_S$ value corresponds to an average 'footprint' of about 50 Å$^2$/chromophore.

$$\frac{\chi_{zzz}^{(2)}}{\chi_{zyy}^{(2)}} = 2\cot^2\psi \tag{1}$$

$$N_s = \frac{Ix\chi_{zzz}^{(2)}}{\beta_{zzz}x\cos^3\psi} \tag{2}$$

Example 7

More particularly, a 50 nm thick film can be integrated into a hybrid device-type structure, based on an all-polymer waveguide structure. (See, FIG. 8). The performance of this self-assembled modulator is being characterized. Preliminarily, modulation has been observed upon applying a potential across the two gold electrodes (FIG. 9). A control experiment with a device lacking the self-assembled superlattice did not exhibit this phenomenon. The switching potential is currently rather high (~280V) for practical applications. Modulation at lower potentials can be achieved in accordance with the present invention by (i) replacing the fluorinated Cytop™ layer with a conducting polymer or transparent conducting oxide (TCO) film, (ii) increasing the self-assembled film thickness, (iii) incorporation of ultra high-β chromophore-based superlattices, and (iv) improving the device processing procedure. The transparency of the prototype electro-optic modulator is highly angle-dependent on the polarization of the input light (FIG. 10). Maximum transmission is observed at 15° and 130°, respectively.

Example 8

The iterative chemisorptive self-assembly process of this invention and the structural regularity of the resulting chromophore E-based (Cpd 2) multilayers (FIG. 11) have been unambiguously characterized by a full complement of physicochemical techniques: optical transmission spectroscopy, advancing aqueous contact angle measurements, X-ray photoelectron spectroscopy, X-ray reflectivity, and angle-dependent polarized second harmonic generation.

Chromophore F-based monolayers (FIG. 11) have been obtained and identified by optical transmission spectroscopy, aqueous contact angle measurements, X-ray reflectivity, and angle-dependent polarized second harmonic generation measurements. Remarkably, the electro-optic response is about 3-4 times than that of a similar E-based film ($\chi^{(2)}$ is estimated to be >600 pm/V) (FIG. 12).

Example 9

The following step-wise procedure is provided with respect to the synthetic sequence illustrated in FIG. 13. All reactions were carried out under inert atmosphere. Solvents were dried, distilled, and degassed before use. The compounds were characterized using conventional analytical techniques.

Step 1. An aqueous solution of $NaNO_2$ (0.45 g, ~5 mL) was added portion wise to a slurry of 6-amino-2-pyridin-4-yl-benzothiazole (1.42 g, 6.26 mmol) in $H_2SO_4$ (25 mL, 4 M). The mixture became clear and was added to a slurry of N-phenyldiethanolamine (1.1 g, 6.1 mmol) in 50 mL $H_2O$ at 0° C. A dark red solution formed instantaneously and was immediately neutralized with aqueous NaOH (9 g, 20 mL). After subsequent stirring at room temperature for 1½ h a dark red precipitate was obtained by filtration. TLC (ethyl-actetate) indicated the presence of a new product and N-phenyldiethanolamine. Recrystallization from iso-propyl alcohol yielded the pure dihydroxy product (1.15 g, 45%).

Step 2. The dihydroxy compound (0.46 g, 1.1 mmol) was reacted with (tert-butyl)dimethyl-chlorosilane (0.63 g, 4.2 mmol) and imidazole (0.63 g, 9.3 mmol) in 5 mL anhydrous THF for 7 h under Ar. TLC (ethyl-acetate) after 1 h indicated that no starting material remained. The crude was dried under high vacuum overnight at room temperature, dissolved in hexane (100 mL) and washed (4×) with $H_2O$ (5 mL) till neutral. The hexane was removed by rotavap and the orange disilyl material was dried under high vacuum (0.11 g, 16%).

Step 3. A dry THF solution (7 mL) of the disilyl compound (100 mg, 0.15 mmol) and 6.5 equiv of 3-iodo-n-propyl-trimethoxysilane (200 µL, 1.27 mmol) were loaded into a pressure vessel (25 mL) and heated overnight at 90° C. under Ar. The THF and excess 1-iodo-n-propyl-3-trimethoxy-silane were then removed under vacuum at 80° C. The resulting solid was washed with dry pentane. The ammonium product was dried under high vacuum (65 mg, 0.07 mmol).

Example 10a

Growth of metal oxide superlattices: (i) Chromophore self-assembly. With reference to FIG. 16, ITO, sodium lime glass, and/or silicon substrates were loaded into a Teflon sample holder and immersed in a toluene solution of chromophore precursor shown (2.0 mM) for ≧20 h at 85° C. After cooling to 25° C., the purple substrates were washed with toluene and THF, sonicated in acetone for 5 min., and dried at 25° C. under vacuum. (ii) Chromophore deprotection. Substrates functionalized with the precursor were immersed in a freshly prepared THF solution of $^nBuN_4F$ (0.06 mM) for 4 min, washed with THF and MeOH, sonicated in acetone for 5 min., and dried at 25° C. under vacuum. (iii) Capping with polysiloxane. The substrates were immersed in a dry heptane solution of $Si_3O_2Cl_8$ (34 mM) for 30 min, washed twice with dry pentane, sonicated in acetone for 15 min, and dried at 115° C. for ~5 min. The substrates were then cooled to 25° C. under vacuum or by passing an Ar stream through the reaction vessel. (iv) Reaction with Group III metal oxide precursors, such as $Ga(i-OC_3H_7)_3.HOC_3H_7$ or $In(i-OC_3H_7)_3.HOC_3H_7$. The substrates were immersed in a freshly prepared dry THF solution of $M(i-OC_3H_7)_3.HOC_3H_7$ (M=Ga or In; 1.0 mM) for 30 min, washed twice with dry pentane, sonicated in acetone for 2 min and dried by passing an Ar stream through the reaction vessel. (v) see step iii. Chromophore precursor and $Si_3O_2Cl_8$ solutions were used for three and five repetitions, respectively.

Example 10b

With reference to the procedure of example 10a, superlattice films can also be prepared incorporating high Z value compositions of Group IV transition metals such as but not limited to Hf. Commercially available $Hf(i-O_3H_7)_4.HOC_3H_7$ was used a precursor material but other Hf, Group IV and/or related transition metal reagents can be used with good effect.

Example 11

The four-component SAS multilayers prepared in the preceding example were characterized by a full complement of compositional and microstructural techniques: X-ray photo-electron spectroscopy (XPS), inductively coupled plasma spectroscopy (ICP), spectroscopic ellipsometry, optical (UV-vis) spectroscopy, synchrotron X-ray reflectivity (XRR), atomic force microscopy (AFM), and angle-dependent polarized second harmonic generation (SHG). The incorporation of Ga and In in the multilayer structures was unequivocally confirmed by ICP and XPS. In a typical ICP experiment, the group 13 (Group III) metal was extracted with boiling concentrated HCl from the SAS, the solution diluted with deionized $H_2O$, and subjected to ICP analysis revealing the presence of the Ga or In. XPS measurements on a 5-layer SAS reveal the presence of C, O, N, I, Si, and Ga or In. The Ga $2\rho_{3/2}$ and In 3d photoelectron peaks are centered at 1117.6 eV and 444.6 eV, respectively, consistent with $M^{3+}$ species having M—O bonds in the coordination sphere. No peaks assignable to $M^0$ or $M^{+1}$ species were detected.

Example 12

Figures 17A, 17B, 17C:
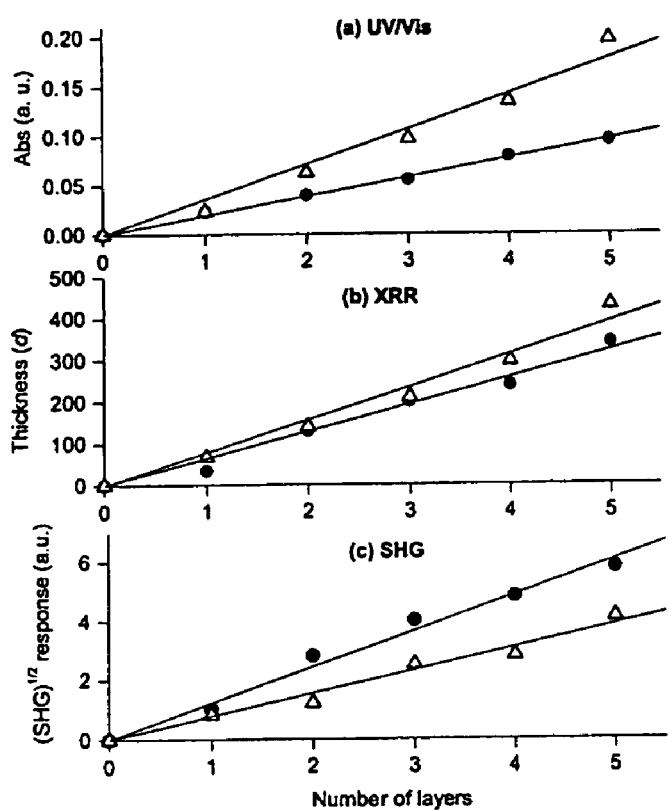

The linear dependence of the HOMO-LUMO CT optical absorbance of the chromophone of example 10 at $\lambda$=557 nm (Ga) and $\lambda$=564 (In), as well as the XRR-derived film thickness, on the number of layers unambiguously demonstrates that equal quantities of chromophore, polysiloxane, and metal oxide structures are uniformly deposited in each repeating layer (FIGS. 17A-B). From the slopes of the thickness vs. number of layers, an average interlayer spacing of 62±3 Å(Ga) and 70±3 Å(In) is deduced from the XRR data. From previous XRR studies, the chromophore and siloxane layer thicknesses are known to be ~12 and ~8 Å, respectively. The XRR-derived electron densities of the hybrid Ga and In films are ~130% (0.92eÅ$^{-3}$) and ~165% (1.16eÅ$^{-3}$), respectively, that of reported literature values for the native $SiO_2$ ($\rho^{(SiO2)}$=0.68), indicating the presence of a relative dense (inorganic) structure. The estimated electron densities of the present Ga (1.53eÅ$^{-3}$) and In (1.79eÅ$^{-3}$) oxide/composition sheets are in good agreement with $Ga_2O_3$ and $In_2O_3$ electron densities of 1.56 and 1.89, respectively, computed from reported crystallographic data. XRR measurements further reveal that the Ga-based films have better defined interfaces than the In-based films, consistent with greater structural ordering as is evident in the UV-vis and SHG data (FIGS. 17B-C). The XRR-derived $\sigma_{film-air}$ width for 5-tetralayer Ga and in films is ~10% (~3 nm; FIG. 18B). X-ray diffraction measurements suggest an amorphous film structure.

Example 13

As discussed above, intercalation of high-Z oxide components into the SAS microstructure was hypothesized to increase the film index of refraction. Indeed refractive indices of 1.76 (Ga) and 1.84 (In) at 650 nm are calculated for these films from spectroscopic ellipsometry in conjunction with XRR thickness data. These parameters are, in comparison, substantially higher than that of the all-organic chromophore-based SAS-multilayers (n=1.52 at 650 nm; FIG. 18C). As evident from the data of this and preceding examples, the retractive index of an EO material of this invention can be controlled, tuned and/or enhanced by the frequency or number of metal/oxide layers introduced therein during assembly.

Example 14

Contact mode AFM measurements on 5-tetralayer Ga and in samples reveal grain formation and a root mean square (rms) surface roughness of 10±2% (~3 nm) for 1×1 μm$^2$ scan areas. A 2-tetralayer Ga-based film exhibits an essentially identical grain-texture and a thickness of ~14±1 nm, which is in good agreement with the aforementioned XRR data (~13 nm). Chromophoric films lacking the group 13 oxide component have smooth, featureless surfaces with rms surface roughnesses of ≦8%. The apparent morphology difference accompanying inorganic layer incorporation exemplifies another modification of film microstructure. Scanning force microscopy studies of group IV metal-coordination based SA superlattices reveal similar grain-type topographies and similar surface roughnesses. H. Chung, W. S. C. Chang, E. L. Adler, *IEEE J. Quantum Electron.*, 1991 27, 608-617. Polarized transmission SHG measurements at $\lambda_o$=1064 nm indicate a quadratic dependence of the 532 nm light-output intensity ($I^{2\omega}$) with the number of layers, indicating preservation of the acentric microstructure as assembly progresses (FIG. 16D).

Example 15

All organic-based multilayer films (using an iterative combination of steps i, ii, and iii; chromophore 2, FIG. 3) exhibiting large second-order responses, $\chi^{(2)}$~220 pm/V and $r_{33}$~80 pm/v, have similar SHG responses to the Ga (~98%) and In-based SAS structures (~63%) here presented. The angle-dependent SHG interference pattern for each layer demonstrates that the film quality and uniformity is identical on both sides of the substrate (FIG. 18C).

Example 16

XRR studies on transition metal composition intercalated (i.e., an $Hf^{+4}$ oxide) superlattice films of this invention indicated the presence of a relatively dense structure and showed a linear relationship between number of layers and film thickness (FIG. 19). The XRR derived average interlayer spacing of 68±4 Å is similar to that observed for the Ga and In compositions of Example 12. (Compare average interlayer spacing of about 20-25 Å for all organic superlattice films without an intercalated metal compositions.) X-ray diffraction measurements of films including such a transition metal composition support formation of an amorphous structure. The refractive indices of such films are enhanced.

Such observations with a known high-β chromophore subunit and commercially available group 13 metal oxide precursors demonstrate an efficient 'one-pot' approach to the assembly of organic-inorganic hybrid EO-superlattices having refractive indices tunable over a significant and useful range by choice of layer components. The solution-based deposition of metal oxide interfaces, as described herein, is suitable for nanometer scale film construction with regular, vertical organization of different sandwich-type layers and represents a new entry in metal-dependent modification of superlattice physicochemical properties (e.g., thickness, $r_{33}$, $\chi^{(2)}$, refractive index) of siloxane-based functional multilayers. As an added benefit and from a fabrication perspective, no specially designed ligand systems or metal-ion scaffolds are necessary.

While the principles of this invention have been described in connection with specific embodiments, it should be understood clearly that these description are added only by way of example and are not intended to limit, in any way, the scope of this invention. Other advantages and features will become apparent from the claims hereinafter, with the scope of those claims determined by the reasonable equivalents as understood by those skilled in the art.

What is claimed:

1. A non-linear optical material assembled on a substrate, said material comprising a molecular composite, said composite comprising first and second siloxane capping layers and a metal composition therebetween, said composition the sorption product of a metal oxide directly on said first capping layer, said second capping layer directly on said composition, said metal oxide selected from the group consisting of Group III metal oxides and Group IV metal oxides, providing said metal oxide is not said substrate.

2. The material of claim 1 wherein each said capping layer comprises octachlorotrisiloxane.

3. The material of claim 1 wherein said metal is selected from the group consisting of Hf, Ga and In.

4. The material of claim 3 wherein said metal oxide is selected from the group consisting of $Hf^{+4}$, $Ga^{+3}$ and $In^{+3}$ alkoxides.

5. The material of claim 1 comprising at least two of said composites and having an acentric chromophore molecular layer therebetween.

* * * * *